US006616530B2

(12) United States Patent
Pearce et al.

(10) Patent No.: US 6,616,530 B2
(45) Date of Patent: Sep. 9, 2003

(54) ROULETTE WHEEL WINNING NUMBER DETECTION SYSTEM

(75) Inventors: Henry Colin Pearce, Middlesex (GB); Christopher Lewis Read, London (GB)

(73) Assignee: Technical Casino Services Ltd., London (GB)

(*) Notice: Subject to any disclaimer, the term of this patent is extended or adjusted under 35 U.S.C. 154(b) by 0 days.

(21) Appl. No.: 10/202,321

(22) Filed: Jul. 24, 2002

(65) Prior Publication Data

US 2003/0060263 A1 Mar. 27, 2003

Related U.S. Application Data

(63) Continuation of application No. PCT/GB01/00276, filed on Jan. 24, 2001.

(51) Int. Cl.[7] ........................................ A63F 13/00
(52) U.S. Cl. ........................................ 463/17
(58) Field of Search .............................. 463/16–17, 20, 463/22, 25, 30–31, 34, 36–37, 43; 273/142 A, 142 B, 142 C, 142 D, 142 F, 142 G, 142 H, 142 HA, 142 J, 142 JA, 142 JB, 142 JC, 142 JD, 142 K, 142 E, 142 R, 141 R

(56) References Cited

U.S. PATENT DOCUMENTS 4,357,015 A * 11/1982 Santora et al. ................ 463/22
5,801,766 A * 9/1998 Alden ........................ 348/157
5,995,663 A 11/1999 Itsuzaki et al. ............. 382/203

FOREIGN PATENT DOCUMENTS

| | | | |
|---|---|---|---|
| DE | 2656024 | A1 | 6/1978 |
| EP | 0194630 | A2 | 3/1986 |
| WO | WO 9511067 | | 4/1995 |
| WO | WO 9528996 | | 11/1995 |

* cited by examiner

*Primary Examiner*—Kim Nguyen
(74) *Attorney, Agent, or Firm*—Baker Botts L.L.P.

(57) ABSTRACT

Disclosed is a detection system for detecting a winning number in a roulette game played on a roulette wheel having pockets for receiving a ball and having colored pocket number regions corresponding to the respective pockets, including a video camera for generating a video image of the roulette wheel including at least one colored pocket number region and a corresponding pocket. The video data at an array of points in a first specified area of the color video image corresponding to a region through which the color pocket number region will pass are sampled when the cylinder of the roulette wheel is spun. The identity of the colored pocket number regions are determined from the sampled video data provided by the array of points. The video data is also sampled at a plurality of points in a second specified area in which the ball can be expected to be when in the pocket corresponding to the identified colored pocket number region. Whether or not the ball is in the pocket is determined using the sampled video data provided by the plurality of points and the identity of the identified colored pocket numbered region is output as the winning number if the ball is determined to be in the corresponding pocket.

16 Claims, 20 Drawing Sheets

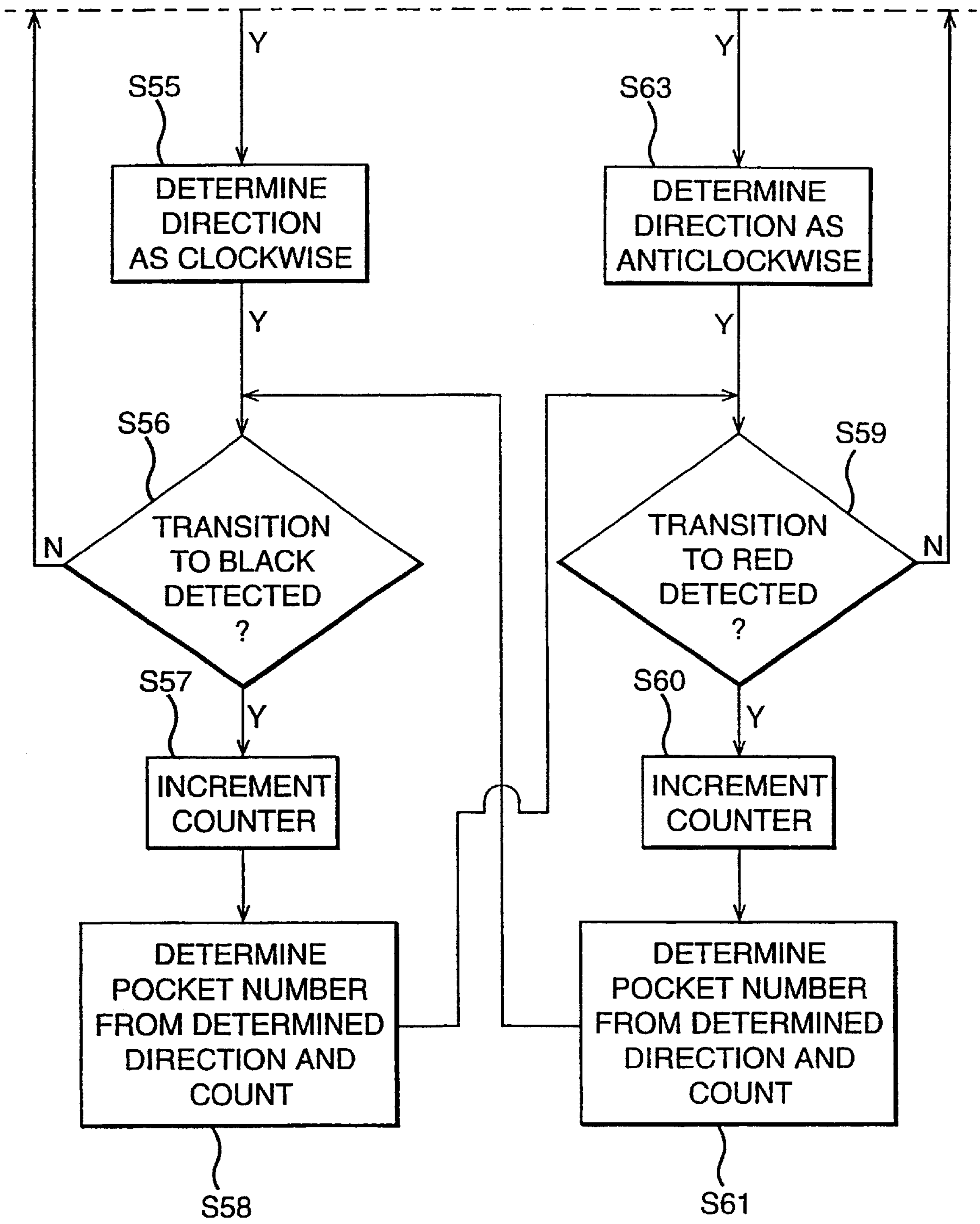
FIG. 17(CONTD.)

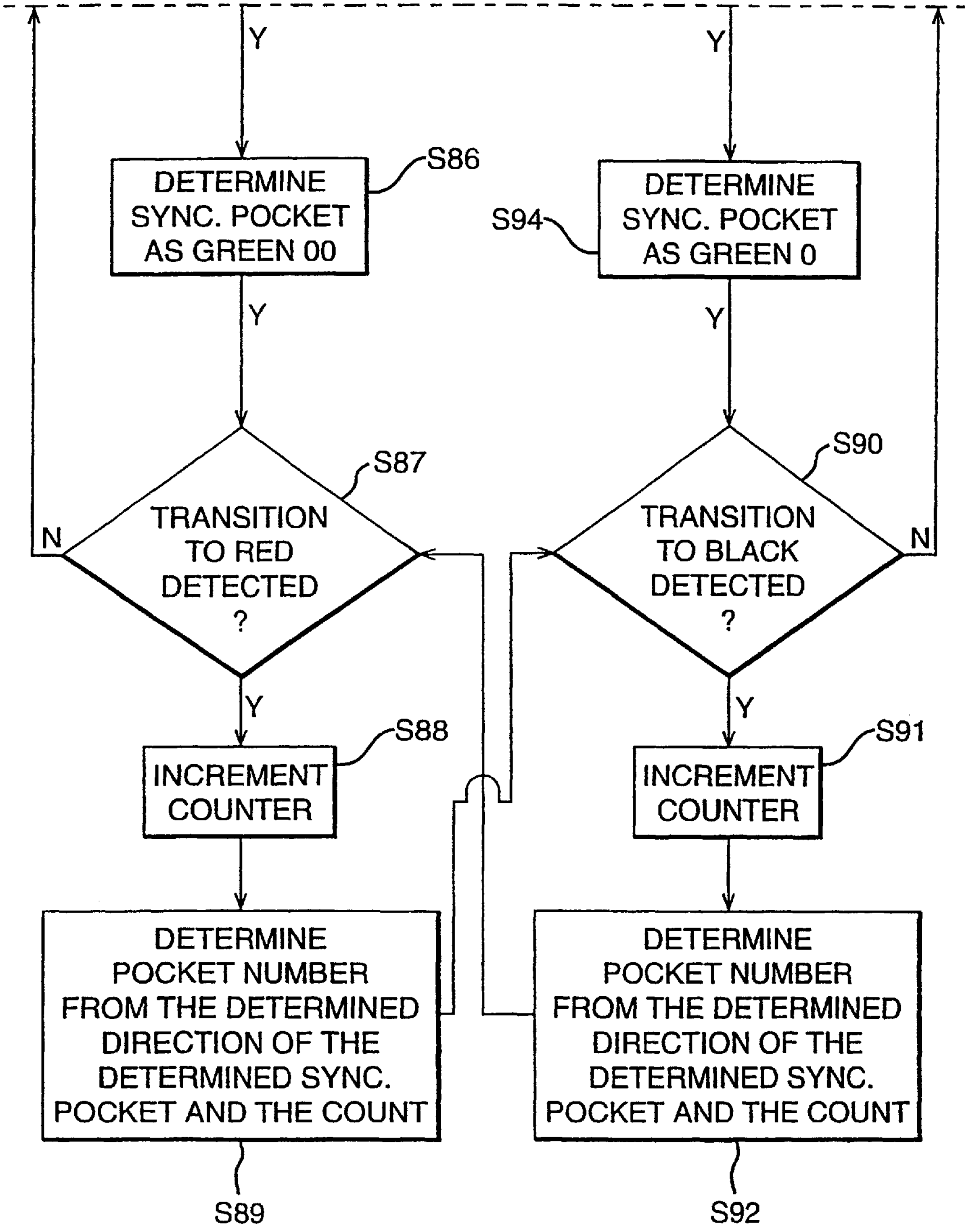
FIG. 19(CONTD.)

ROULETTE WHEEL WINNING NUMBER DETECTION SYSTEM

CROSS REFERENCE TO RELATED APPLICATIONS

This is a continuation of international application PCT/GB01/00276, with an international filing date of Jan. 24, 2001, incorporated herein by reference, published in English on Aug. 2, 2001 as international publication WO 01/55988 A1 under PCT Article 21(2), and claiming priority of British application 0001592.5 filed Jan. 24, 2000, which is incorporated herein by reference.

BACKGROUND OF THE INVENTION

1. Technical Field of the Invention

The present invention generally relates to a system for detecting the winning number in a roulette game. Systems to detect the position of the ball in a roulette wheel are used both to illuminate a display to indicate the winning number to the players and to collect information for statistical processing. The latter enables the casino to detect that the wheel and its croupier are operating fairly and without bias.

2. The Related Art

In one prior art technique disclosed in WO 95/28996, a detection system is disclosed which uses modulated visible light and analog electronics in order to detect a ball in a pocket and to identify the pocket in which the ball lies. This arrangement suffers from the disadvantages of being both difficult to align and inaccurate due to the use of analog electronics in the detection of reflected light.

In WO 95/11067, a security system is disclosed in which a video camera is used not only to monitor cheating at the gambling table, but also to detect the winning number by detecting the ball in a pocket of the roulette wheel. This technique suffers from the disadvantage of requiring an image of the whole of the roulette wheel, thus requiring the video camera to be mounted above the roulette wheel such as in the ceiling of the casino. Thus apart from the technical difficulties, this is unpopular with casino managers. Further, the technique requires points around the roulette wheel to be determined to generate a linear array. Only a line of points are taken through each pocket number region associated with the pocket, and thus this method of identifying pockets in the roulette wheel is prone to error.

SUMMARY OF THE INVENTION

An object of the present invention is to overcome the limitations in the prior art and to provide an accurate and compact winning number detection system for a roulette wheel.

Accordingly, one aspect of the present invention provides a detection system for detecting a winning number in a roulette wheel game in which video images of at least one pocket and at least one corresponding colored pocket number region in a one-fifth region of the roulette wheel are obtained. The system does not require an image of the whole roulette wheel. Thus the video camera used to obtain the video images can be mounted in a more convenient position, such as at the side of the roulette wheel.

To identify the pocket, processing is carried out on an array of points in an area corresponding to a pocket number region in the video image. The use of an array of points is robust and avoids errors due to reflections from the numbers provided in the pocket number regions and other spurious reflections. Once the pocket number region in the image has been identified, whether or not a ball is present in the corresponding pocket is determined by sampling a number of points in the image in a region of the pocket in which the ball would be expected to be present. If the ball is detected, the winning number is output as the identified corresponding pocket number region.

One aspect of the present invention provides for automatic identification of a first fixed area within the color pocket number region, and a corresponding second fixed area within a corresponding pocket in which the ball can be expected to lie. The automatic identification of the sampling areas can be achieved in view of the limited field of view over the roulette wheel, i.e., the image is of only a section of the roulette wheel. The identification is preferably further simplified by the use of a target which is placed in a predetermined pocket. The target is readily identifiable against the background of the roulette wheel. The location of the target can be carried out using any form of recognition technique, e.g., a correlation technique. Because the relationship between the pocket and the corresponding colored pocket number region is known, the search for the sampling area within the colored pocket number region is simplified once the position of the target has been determined, i.e., not all of the image need be searched to identify the area.

The present invention can be applied to monochromatic images, wherein the identities of the pockets can be determined from the intensity of the sampled pixels in the areas: black pocket number regions providing low intensity pixels, and red and green pocket number regions providing higher intensity sample pixels. In this monochromatic imaging technique, the green pocket number region can be distinguished from the red pocket number region only by monitoring the sequence of pocket number regions as they pass through the field of view as the roulette wheel is spun. Put another way, the green pocket lies between a red and a black pocket in the single zero roulette wheel, and can be detected by detecting two high intensity colored pocket number regions in succession.

The present invention is, however, more preferably implemented using color video data from a color video camera. Using color video data, the identity of the pockets can be more easily determined by classifying the sample points in the first fixed area into four categories, i.e., red, black, green and white. The pixel categorization at the sample points can simply be determined by the use of thresholds. In one embodiment, the intensity is used to distinguish black and white, and a V component calculated in YUV color space is used to distinguish red and green. The present invention is not, however, limited to the use of intensity and V values, and any single color coordinates or multiple color coordinates in any color space can be used.

In a preferred embodiment, a method of identifying the colored pocket number regions includes determining the color of each pocket number region as it passes the field of view on the video camera, and comparing the sequence of detected colors with a stored sequence of color pocket number identities for the roulette wheel. Because the sequence will depend upon the direction in which the roulette wheel is spun, in one embodiment, the direction of rotation of the roulette wheel is also detected to enable the selection of the correct stored sequence of color pocket number identities to be used in the identification of the colored pocket number region in the image. When a color image is provided, and the roulette wheel has a single green zero pocket number region, it is possible to determine the direction of rotation of the roulette wheel by detecting whether the color transition to the green pocket is from red or from black. Another technique for determining direction which is applicable to monochrome images, and to the use with roulette wheels which have a green single zero pocket number region and a green double zero pocket number region, comprises comparing sequential video images to identify the direction of movement of an edge of the colored pocket number region.

In one embodiment, the identity of the colored pocket number region is determined using the sample points arranged as a plurality of spaced radial lines. Each line of sample points is used to provide an indication of the identity of the pocket number region. For each sample point, a determination is made of the classification of a pixel, e.g., red, green, black and white for color images, or black or red/green for monochrome images. An identification for each radial line is obtained by determining which identity is most common to the points along that line. The identity of the colored pocket number region is then determined as the identity for the majority or a predetermined number of the radial lines of points. In this way each radial line acts as if it were a separate "sensor," and the identity of the colored pocket number region is determined from the majority or a predetermined number of the "sensors". The identity determined is merely an indication of the color for the pocket number region, and further information, e.g., a pocket number sequence, is required in order to identify the pocket number displayed on the pocket number region.

Thus this technique of sampling the image in a restricted area provides a fast recognition technique over a 2-dimensional area.

The processing carried out by the present invention can either be implemented in specific design hardware, or in a general purpose computer implementing a computer program comprising program routines. The present invention can thus be embodied as a computer program which can be provided on a carrier medium such as a storage medium, e.g., floppy disk, CD ROMs, programmable memory device, and magnetic tape, and a signal such as an electrical signal carried over a network such as the Internet.

BRIEF DESCRIPTION OF THE DRAWINGS

For a more complete understanding of the present invention, reference is made to the following detailed description of exemplary embodiments with reference to the accompanying drawings, in which.

DETAILED DESCRIPTION OF THE EXEMPLARY EMBODIMENTS

Figure 1:
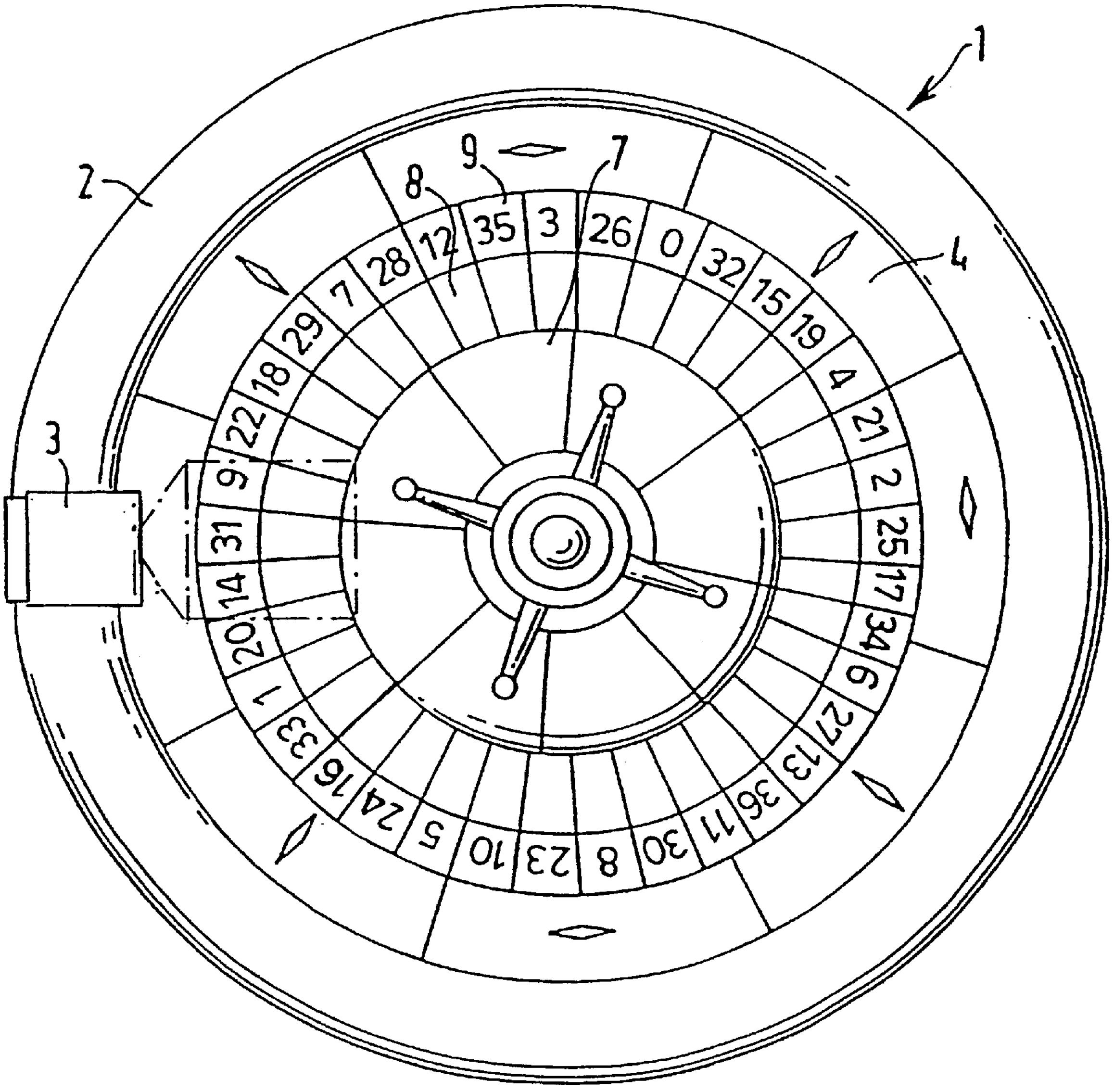
FIG. 1 is a plan view of a roulette wheel showing the detection head of an embodiment of the present invention in position.

FIG. 1 is a plan view of a roulette wheel 1 having a rim 2 onto which is mounted a detector head 3, in accordance with an embodiment of the present invention for detecting the winning number during a roulette game.

Figure 2:
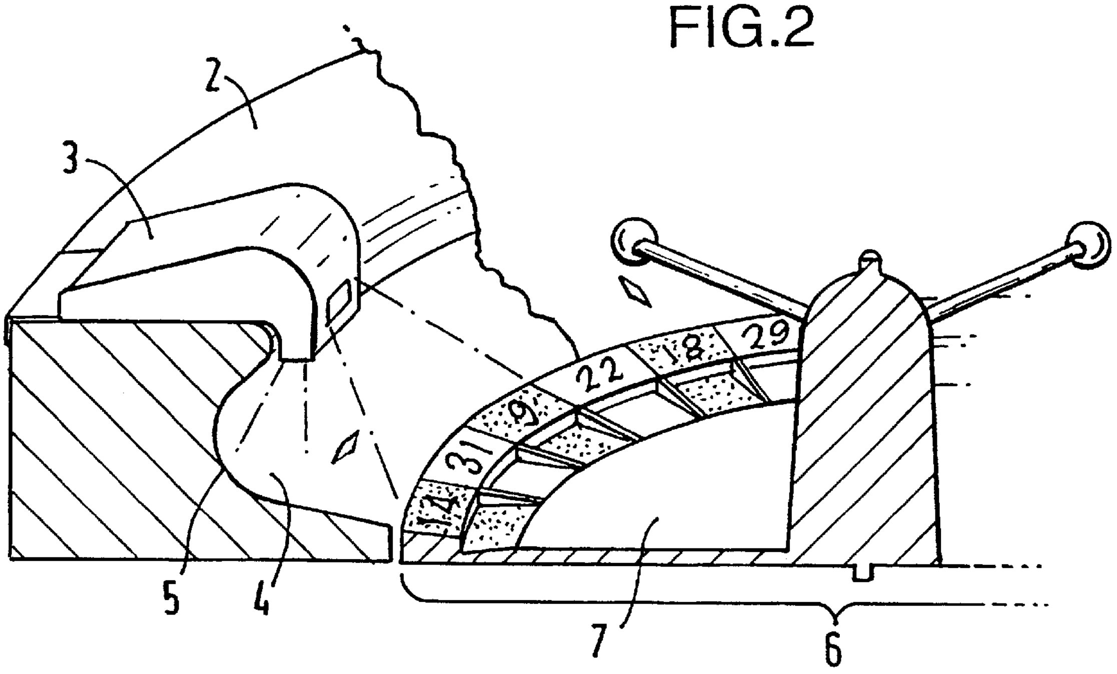
FIG. 2 is a part sectional view of the roulette wheel showing the detection head in position.

As shown in FIG. 2, the roulette wheel has a sloping surface 4 inside the rim 2 which joins the rim 2 at an undercut face 5 around which the ball is spun at the start of the roulette game. The detector head 3 is arranged to clamp over the rim 2 of the roulette wheel, and includes a sensor for detecting a ball passing in the undercut region 5 of the rim. In this way it can be detected that a ball is in play. The detector head 3 is also provided with a video camera to view a section of the roulette wheel including at least one pocket.

The central part of the roulette wheel comprises a cylinder 6 which is rotated during the game while the ball is spun around the undercut region 5 of the rim 2. On the cylinder 6 there is provided a sloping face 7. Referring again to FIG. 1, pockets 8 are arranged in an annulus around the sloping face 7, and colored pocket number regions 9 associated with the pockets 8 are arranged in an annulus around the pockets 8.

Figure 3:
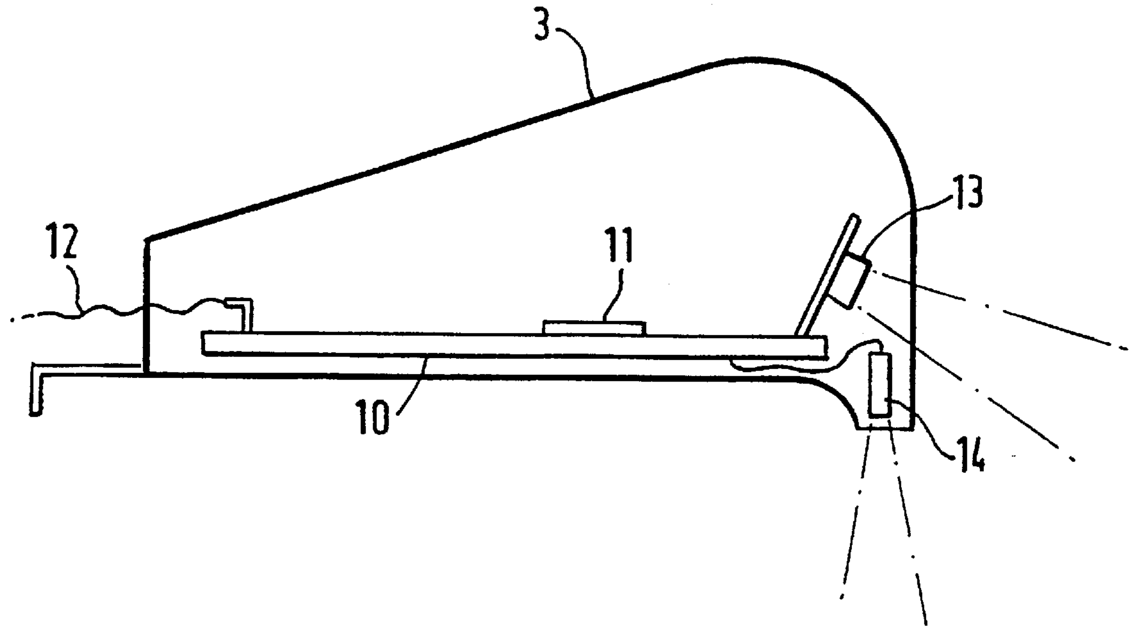
FIG. 3 is a schematic diagram of the components of the detection head.

As can be seen in more detail in FIG. 3, the detector head 3 contains a circuit board 10 carrying circuit components 11 including a microprocessor. Electrical connections are made via connectors 12 to the circuit board 10. Mounted on the circuit board is a video camera 13 for viewing a section of the roulette wheel. Also, a sensor 14 is provided for detecting the presence of a ball in the undercut region 5 of the rim 2, as shown in FIG. 2. The sensor 14 is provided in order to detect that the ball is in play and to detect when a ball is about to leave the rim and fall into one of the pockets 8, as shown in FIG. 1.

Figure 4:
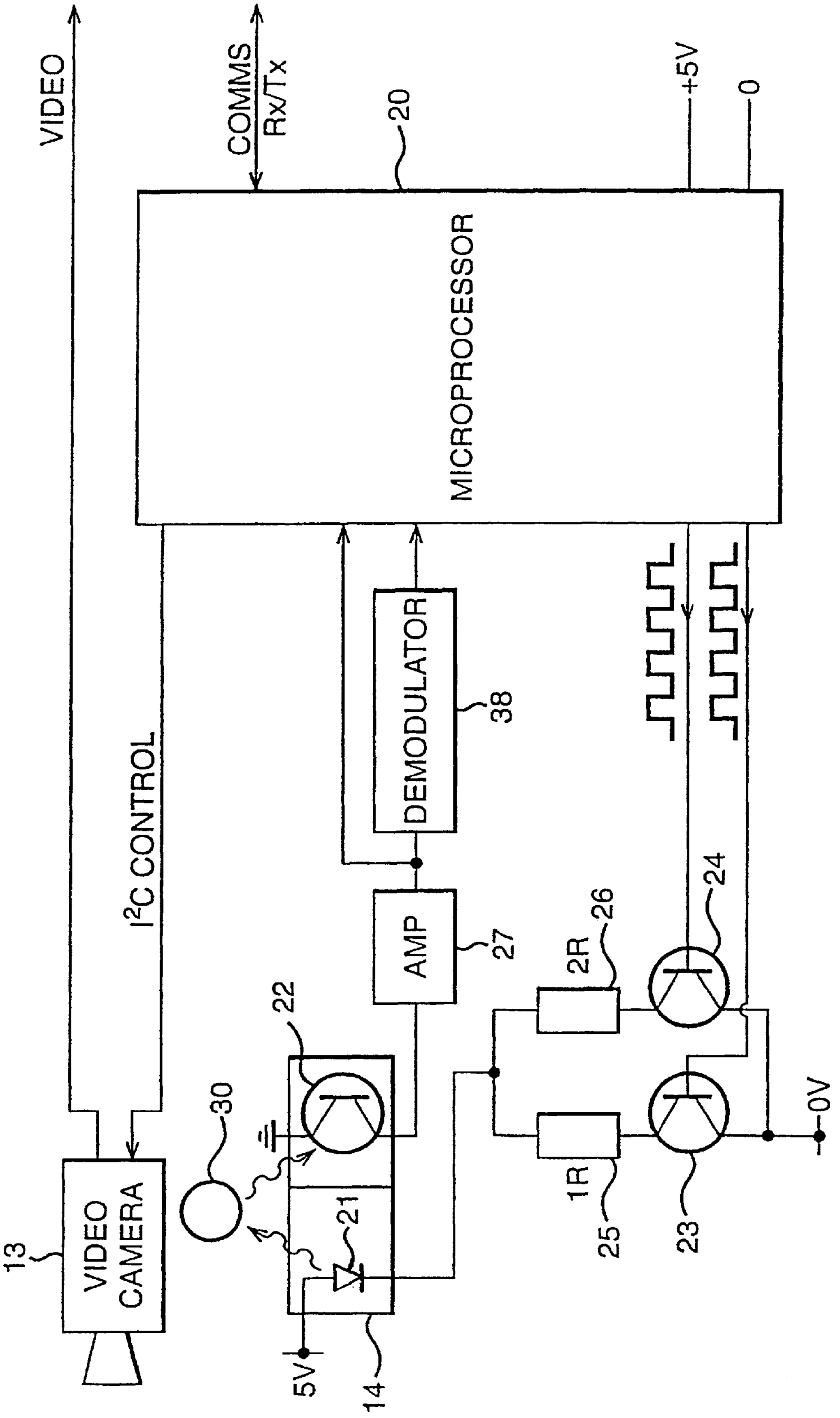
FIG. 4 is a schematic diagram of the components of the detection head.

The components of the detection head 3 will now be described in more detail with reference to the circuit diagram of FIG. 4. In this embodiment, a color video camera 13 is provided which has a wide 45 degree field of view. The camera used in this particular embodiment is the color board camera GP-CX161/45 available from Panasonic. The output from the color video camera comprises a 768 by 288 pixel field every 20 milliseconds, thus providing a 768 by 576 pixel frame every 40 milliseconds. The operation of the video camera 13 can be controlled using a I2C control line from a microprocessor 20 provided on the circuit board 10. This allows for the control of parameters such as white balance.

As mentioned hereinabove, in addition to providing a video image of a section of the roulette wheel, the detection head 3 is able to detect the ball passing underneath it. The circuitry for achieving this comprises the remaining component of the diagram of FIG. 4. The sensor 14 comprises a photodiode 21 for emitting light and a photo-transistor 22 for detecting light reflected by the ball. Two transistors 23 and 24 are provided to drive the photodiode 21. Each of these transistors can provide different driving signal levels by virtue of their connection to the 5 volt supply via resistors 25 and 26. The microprocessor 20 is connected to the transistors 23 and 24 via drive lines, and can send modulated driving signals, i.e., pulse trains, at 1.3 kHz to either one or both of the transistors 23 and 24, to provide an amplitude modulated output from the photodiode 21. If only the transistor 24 is driven, a low drive signal is provided to the phototransistor to generate a modulated output. If the transistor 23 is driven, a signal of twice the amplitude is provided to the phototransistor to produce twice the signal level. When the microprocessor outputs the signal to both the transistors 23 and 24, a higher level can be produced because the outputs are combined. In this way the microprocessor is able to control the output of the photodiode 21 in a binary manner. The level can be set as necessary to ensure that a good signal is received by the phototransistor 22. This will depend upon ambient light conditions and the type of ball used.

The signal received by the phototransistor 22 comprises an amplitude modulated signal which is input to an amplifier 27. The output of the amplifier 27 is input directly into the microprocessor 20 to monitor the signal level and ensure that it is not too high or too low. The output of the amplifier 27 is also input into a demodulator 28 for amplitude demodulation to obtain a signal which will be indicative of the passage of a ball 30 passing underneath the sensor 14; this is input to the microprocessor 20. The input signals are digitally converted within the microprocessor 20. The microprocessor used in this embodiment comprises the PIC16C7X 8 bit CMOS microcontroller with A/D converter available from Microchip Technology Inc. The microprocessor 20 is provided with power on 0 and 5 V inputs, and includes a communications interface (UART) to a communications line.

The output of the microprocessor is a TTL output which includes information identifying when a ball is detected passing underneath the sensor 14.

Figure 5:
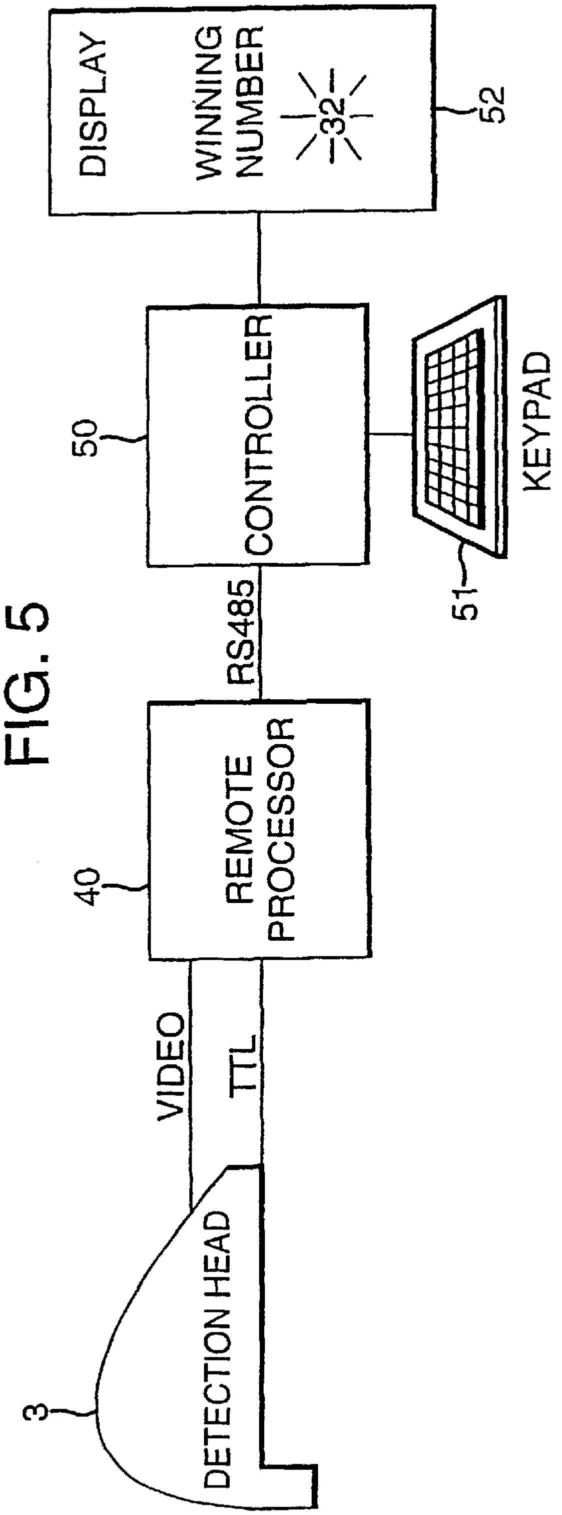
FIG. 5 is a schematic diagram of a winning number display system in accordance with an embodiment of the present invention.

The complete winning number display system will now be described with reference to FIG. 5. The detection head 3 outputs video and TTL to a remote processor 40. The remote processor 40 performs the majority of the computation in order to determine the winning number. In particular, it performs the video processing as will be described in more detail hereinafter. Winning number information is output over an RS485 line to a controller 50, which is provided with a key pad 51 and is connected to a display 52 which is provided in the vicinity of the roulette wheel for the display of the winning number, among other information.

Figure 6:
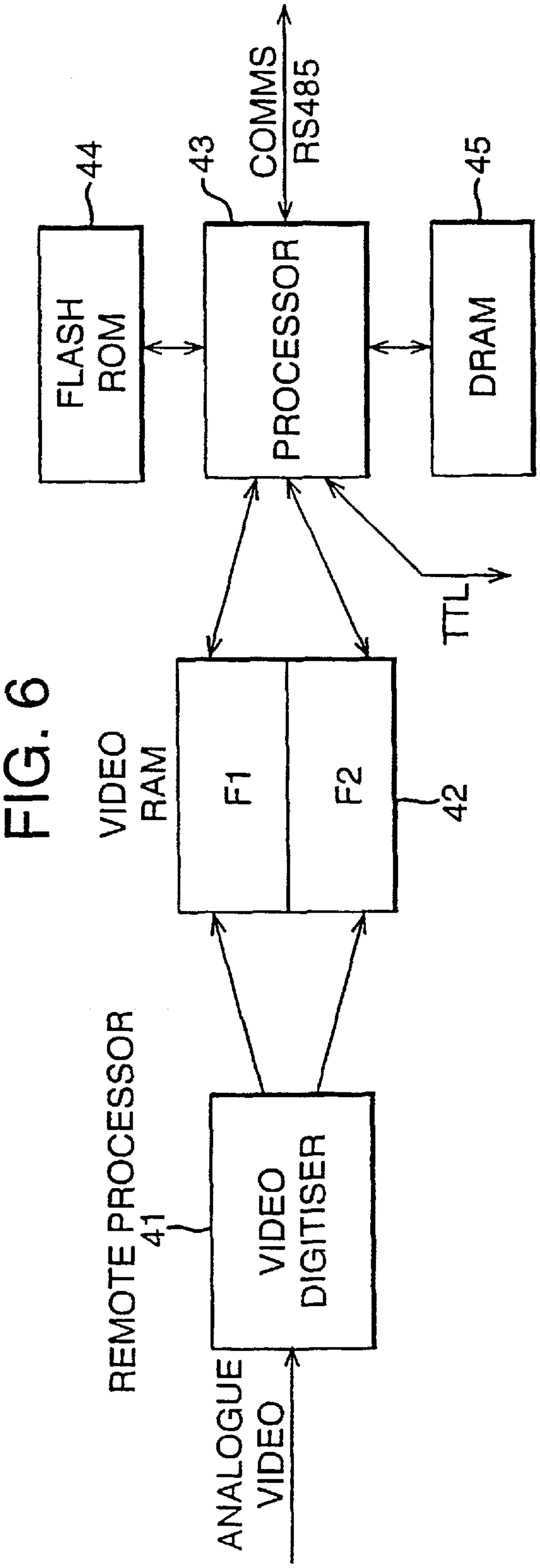
FIG. 6 is a schematic diagram of the components of the remote processor in the winning number display system of FIG. 5.

The remote processor 40 will now be described in more detail with reference to FIG. 6.

An analog video input is received from the video camera 13 in the detection head 3. This is input to a video digitizer 41 for the digitization of the analog video and for the subsampling. The analog video is input at a resolution of 768×288 pixels per field giving the resolution of 768×576 pixels per frame. Each field is subsampled to produce a pixel image of 192 by 144 pixels. A video random access memory (RAM) 42 is provided having two sections F1 and F2 to act as ping pong or field switching buffers for receiving sequential subsampled image fields. Thus each section F1 and F2 of the video RAM 42 has sufficient memory for storage of 192×144 pixels of color image data. In this way, since each successive field is received 20 milliseconds apart, real time processing on each image field is possible.

A processor 43 is provided with flash read only memory (ROM) 44 which contain the computer program code for implementation by the processor 43 and data necessary for the process, e.g., the roulette wheel number sequences. The dynamic random access memory (DRAM) 45 is also provided for use by the processor 43 as a working memory. The processor 43 alternately accesses the video RAM 42 in order to read an image field. The processor 43 implements a program written in C. The processor 43 also includes an interface to receive the TTL output from the detection head 3. The processor 43 further includes an RS485 interface to the RS485 line to the controller 50. Thus, the processor 43 carries out video processing to identify the winning number, as well as the processing of the TTL signals in order to detect that the ball is in play and to detect when the ball is likely to fall, i.e., the point at which no more bets should be placed.

The processor 43 is a 32 bit processor. The output information on the RS485 line is in ASCII code and gives a "ball in play" signal, a "no more bets" signal, a "winning number" signal and a "game over" signal when the ball is removed from the roulette wheel.

The processor 43 receives the TTL output of the detection head 3 and detects pulses indicating when a ball passes the detection head 3. In this way, when a ball is detected twice, it indicates that the ball is passing around the rim and thus the game has started. The period between pulses indicates the speed at which the ball is travelling around the rim. The speed at which the ball will leave the rim to fall towards the pocket can be determined, and thus when it is detected that the speed of the ball has dropped sufficient such that it will leave the rim shortly, a signal can be generated and output over the RS485 line via the controller 50 to the display 52 to display "NO MORE BETS". This process is incorporated with the winning number detection system—as will be described in more detail hereinafter—in a complete roulette field gaming system, the operation of which will be described in more detail hereinafter with reference to FIG. 18.

Figure 7:
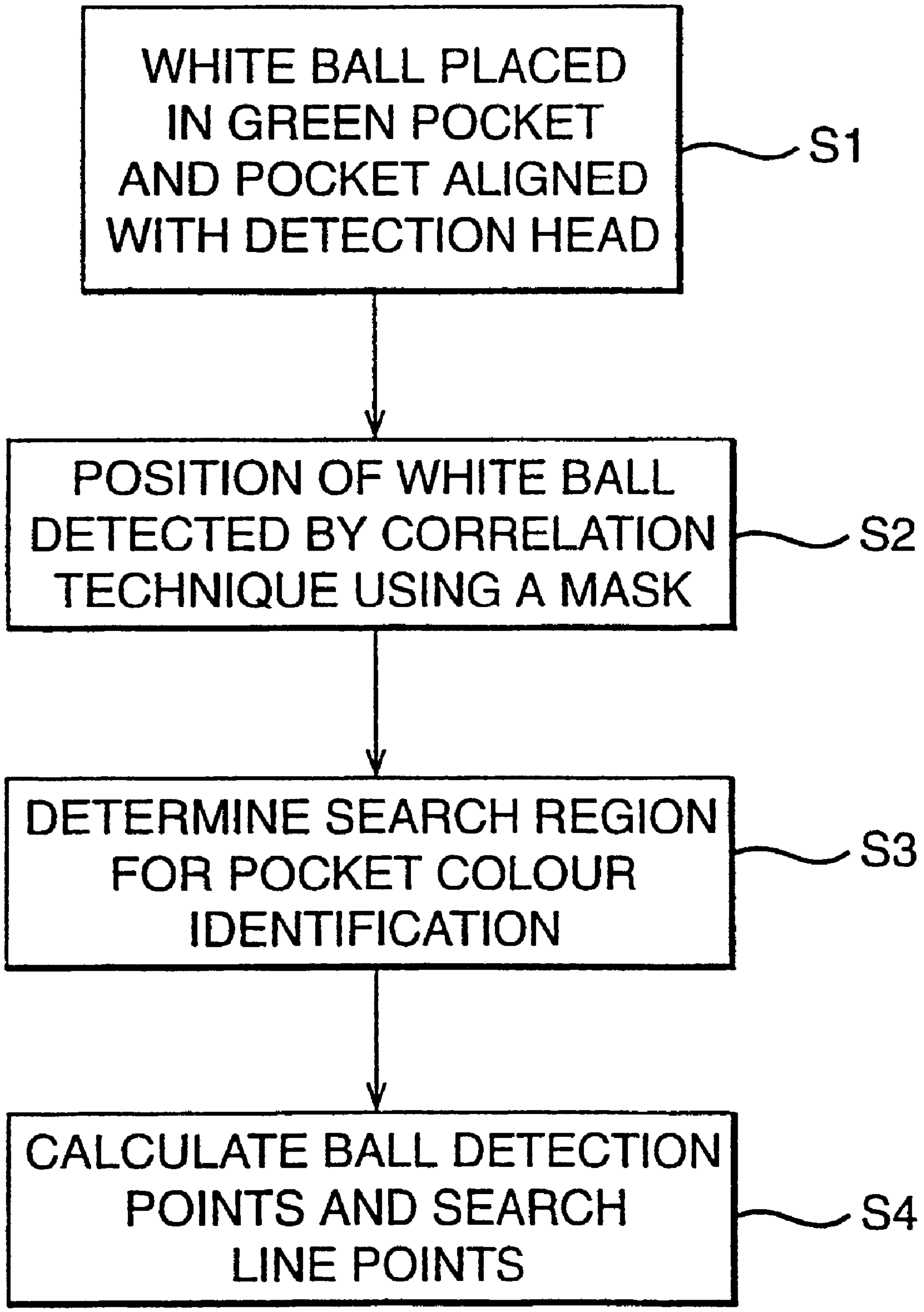
FIG. 7 is a flow diagram illustrating the calibration procedure.

The operation of the system for detecting the winning number will now be described in more detail with reference to FIG. 7. This process comprises processing steps carried out by the processor 43.

When the detection head 3 is initially placed on a roulette wheel, the head must be calibrated for accurate detection. This is achieved by placing a marker in the green pocket. This embodiment comprises the white ball which is placed in the green pocket. The pocket is then aligned with the detection head in step S1 to ensure that the pocket and corresponding pocket number region are in the field of view of the video camera 13. The operator can then initiate calibration using an appropriate key on the keypad 51. The controller 50 then sends the "calibrate" instruction to the remote processor 40, and the processor 43 commences processing of the video data. The position of the white ball in the video image is detected in step S2 by a correlation technique using a mask, as will be described in more detail hereinafter. Once the position of the white ball has been detected, because there is a known relationship between the position of the white ball and the likely area in which the colored pocket number region lies, in step S3 a search region for the pocket color identification process is determined. This will be described in more detail hereinafter. Using the position of the white ball, detection points are calculated in step S4. Also using the determined search region, search line points are determined. These points, which lie in two separate areas, are used for detecting the presence of a ball in a pocket and for identifying the color of the pocket number region, respectively.

Thus the calibration technique automatically and simply identifies regions within the image for the sampling of the pixels to identify the colored pocket number region and to detect the presence of a ball. The use of the target, which is in the form of a white ball in this embodiment, greatly reduces the amount of searching required in order to perform the calibration.

Figure 8:
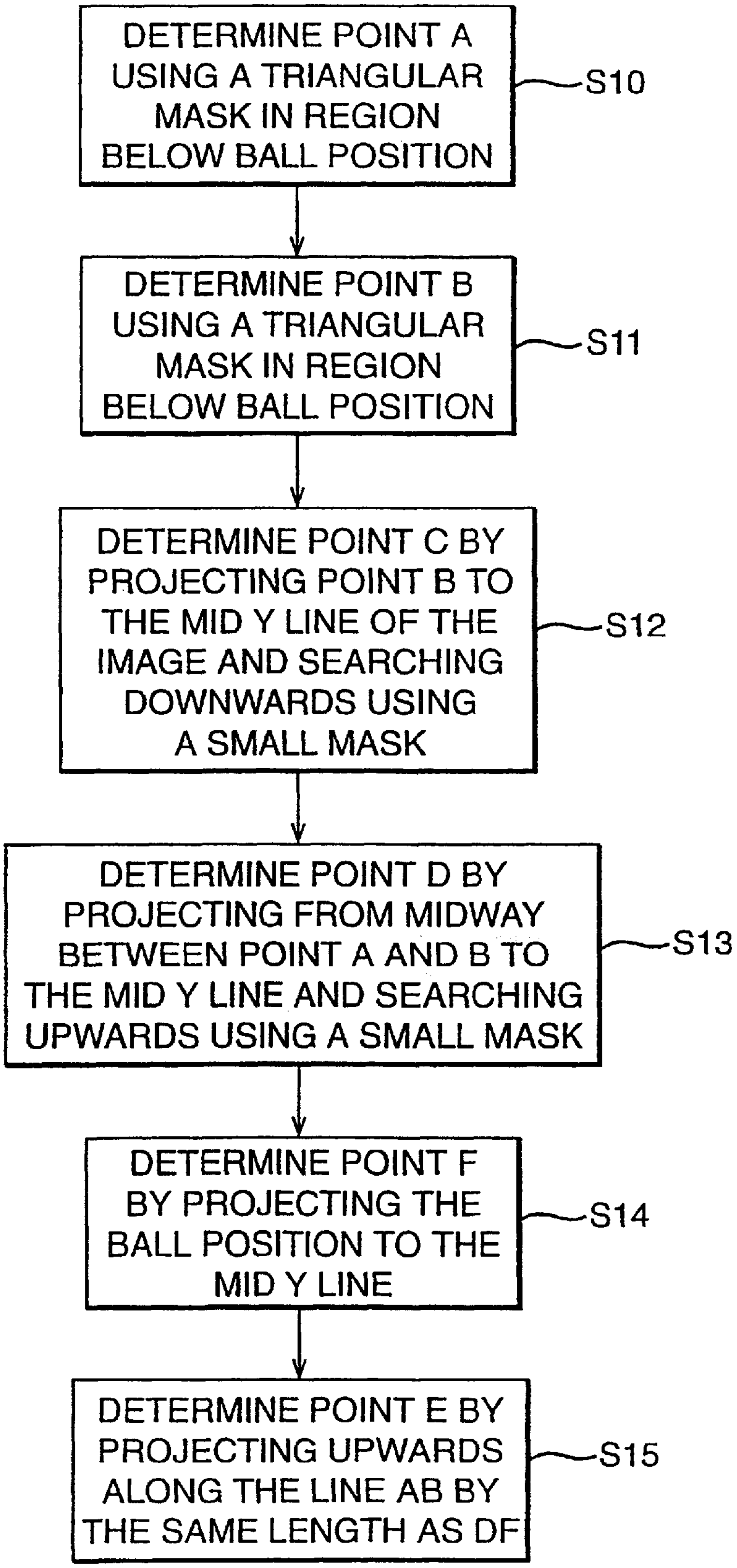
FIG. 8 is a flow diagram illustrating the procedure to determine the fixed sample areas.

The details of step S3 in FIG. 7 will now be described in more detail with reference to the flow diagram in FIG. 8 and the diagrams of FIGS. 9*a* and 9*b*.

Figure 9A:
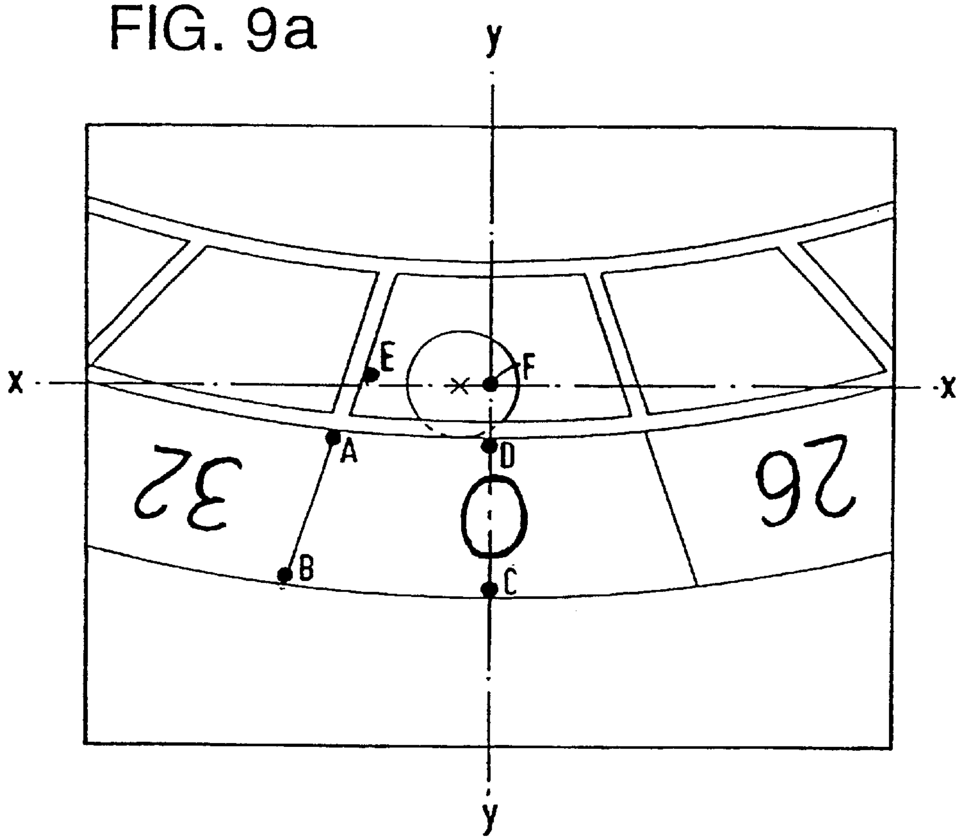
FIGS. 9*a* and 9*b* illustrate the positioning of the points defining the fixed sample areas determined in the method illustrated in the flow diagram of FIG. 8.
Figure 9B:
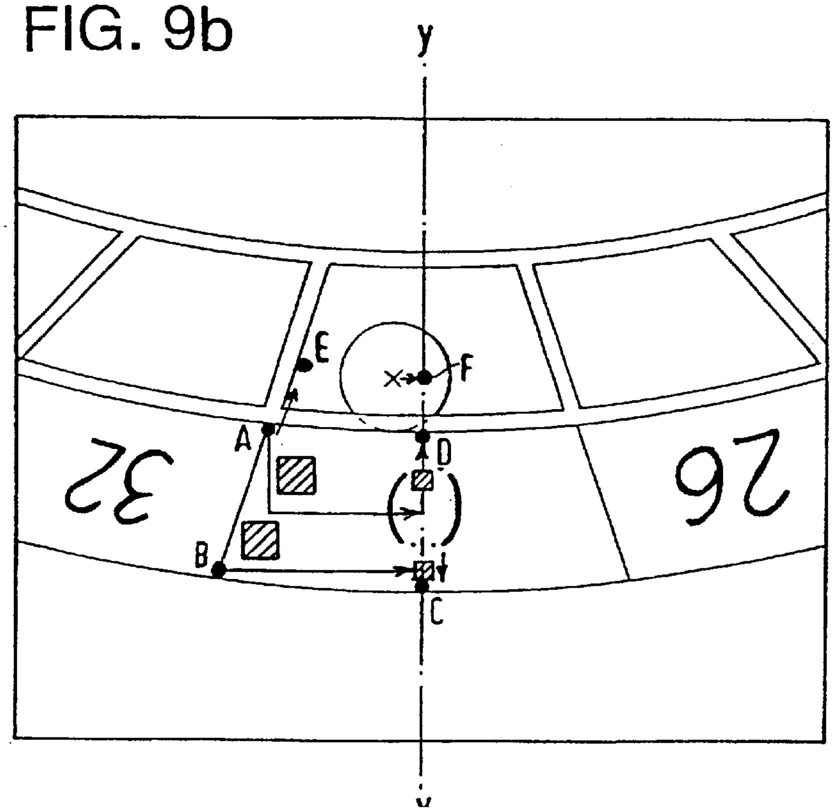

FIGS. 9*a* and 9*b* represent the image data operated on by the video camera in order to locate coordinates used to determine the regions in which sample points are to be arranged. FIG. 9*a* is a view illustrating points A, B, C, D, E, and F determined by this process. The point X represents the position of the ball determined in step S2. This position is determined in step S2 using a simple correlation mask to find where coincidence occurs between the white color mask and the white ball. The mask could be a completely circular one, but in practice a semicircular mask may be preferable, because in some roulette wheels the ball is partially obscured when located in a pocket. Once the position of the white ball has been determined, the search for the points A, B, C, D identifying the colored pocket number region will only be carried out below this point, i.e., below the line X—X in FIG. 9*a*. This search is carried out using a correlation technique and four masks associated with the points A, B, C, and D. Thus, in step S10 of FIG. 8, point A is determined by using a mask in a correlation technique in the region below the ball position. This is illustrated in FIG. 9*b*. The mask will tend to try to move to the corner of the green pocket number region. In step S11, a similar process is carried out to determine point B. In step S12, point C is determined by projecting point B in the X direction to the mid line of the image frame (y—y), and searching downwards by performing a correlation technique using a small square mask. A correlation peak will be detected at the boundary of the green pocket. In step S13, point D is determined by projecting from midway between point A and B in the x direction to the mid y line y—y, and searching upwards by forming a correlation technique using a small square mask. Once again a correlation peak will be detected at the green boundary. In step S14, the point F is determined by projecting the ball position to the mid y line y—y. In step S15, the position of point E is determined by projecting from point A upwards along the line AB by the same length as DF. Thus the process performed in the flow diagram of FIG. 8 results in the points A, B, C, D, E and F identified in the image as illustrated in FIG. 9*a*.

Figure 9C:
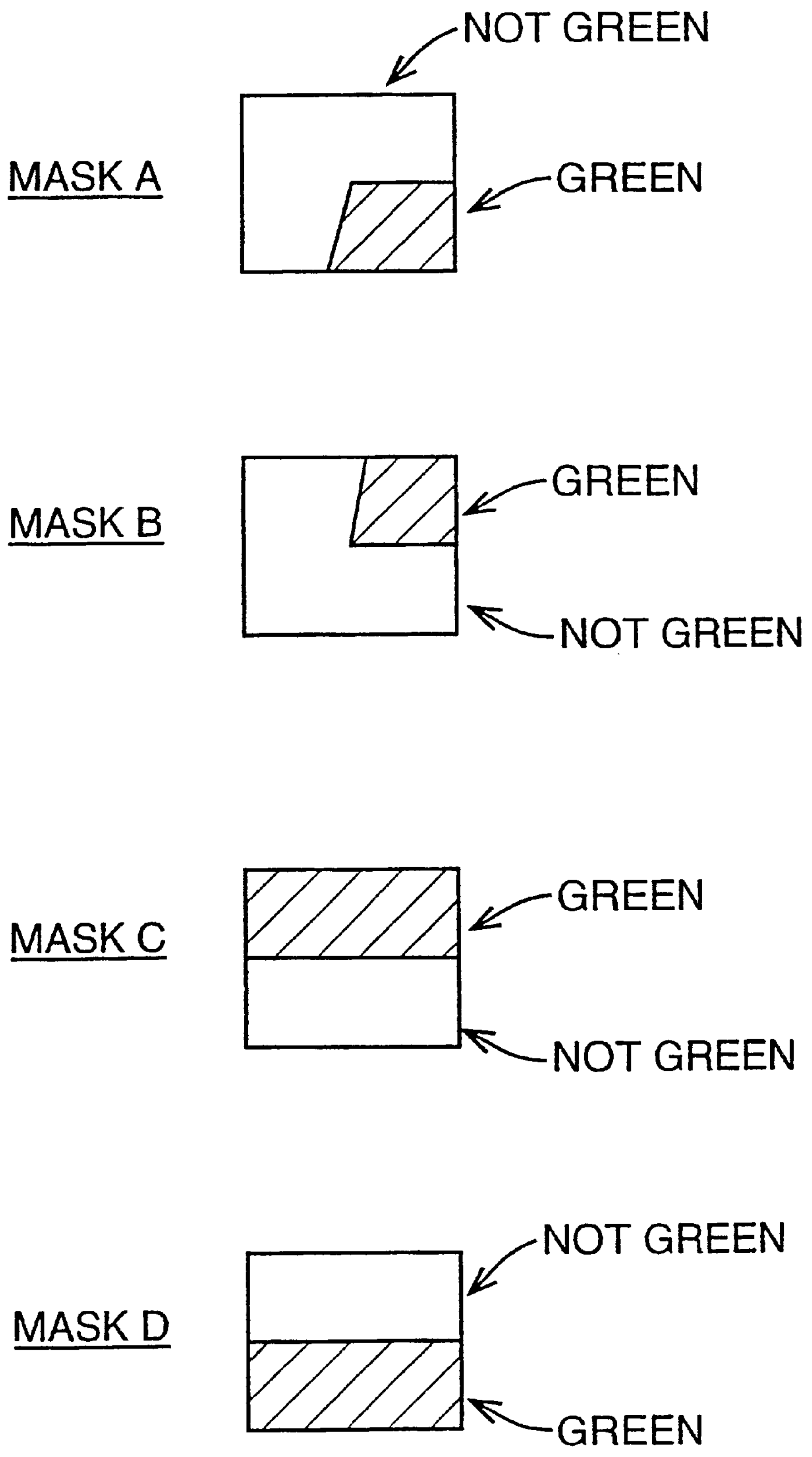
FIG. 9*c* shows four masks used in the process illustrated in FIGS. 9*a* and 9*b;*

FIG. 9*c* shows a preferred format for the four masks used in identifying the points A, B, C and D which replace the triangular masks shown in FIG. 9*b*. In FIG. 9*c*, the masks are rectangular and contain patterns of "GREEN" and "NOT GREEN" with the green patterns indicated by the latched portions. In scale, the rectangular masks are preferably at least twice the area of the triangular masks.

The process used to determine the position of the white ball comprises the determination of the intensity for all pixels in the image. These have a value between 0 and 255, and they are adjusted to have a value of between −128 and +127. A correlation mask comprising intensity values between −128 and +127 is used to correlate with the image. Where the mask and the white ball overlap, a correlation peak is obtained which identifies the ball position.

To perform the correlation technique in order to identify the points A, B, C and D, the color of each of the pixels below the position of the ball is categorized as either black, red, green or white. The process of pixel color determination will be described in more detail hereinafter. Thus the triangular and square mask used in the process of FIG. 8 comprise green masks. The correlation technique is thus a binary correlation technique wherein the number of pixels overlapping of the same color are counted. The algorithm attempts to keep this to a maximum and to optimize the required coordinates, e.g., for point A the y coordinate is minimized and the x is coordinate maximized in order to try to find the top left hand corner, while for the detection of point B, the x and y coordinates are minimized in order to find the bottom left hand corner.

The process for determining the color of the pixels will now be described in more detail with reference to FIGS. 10 and 11.

Figure 10:
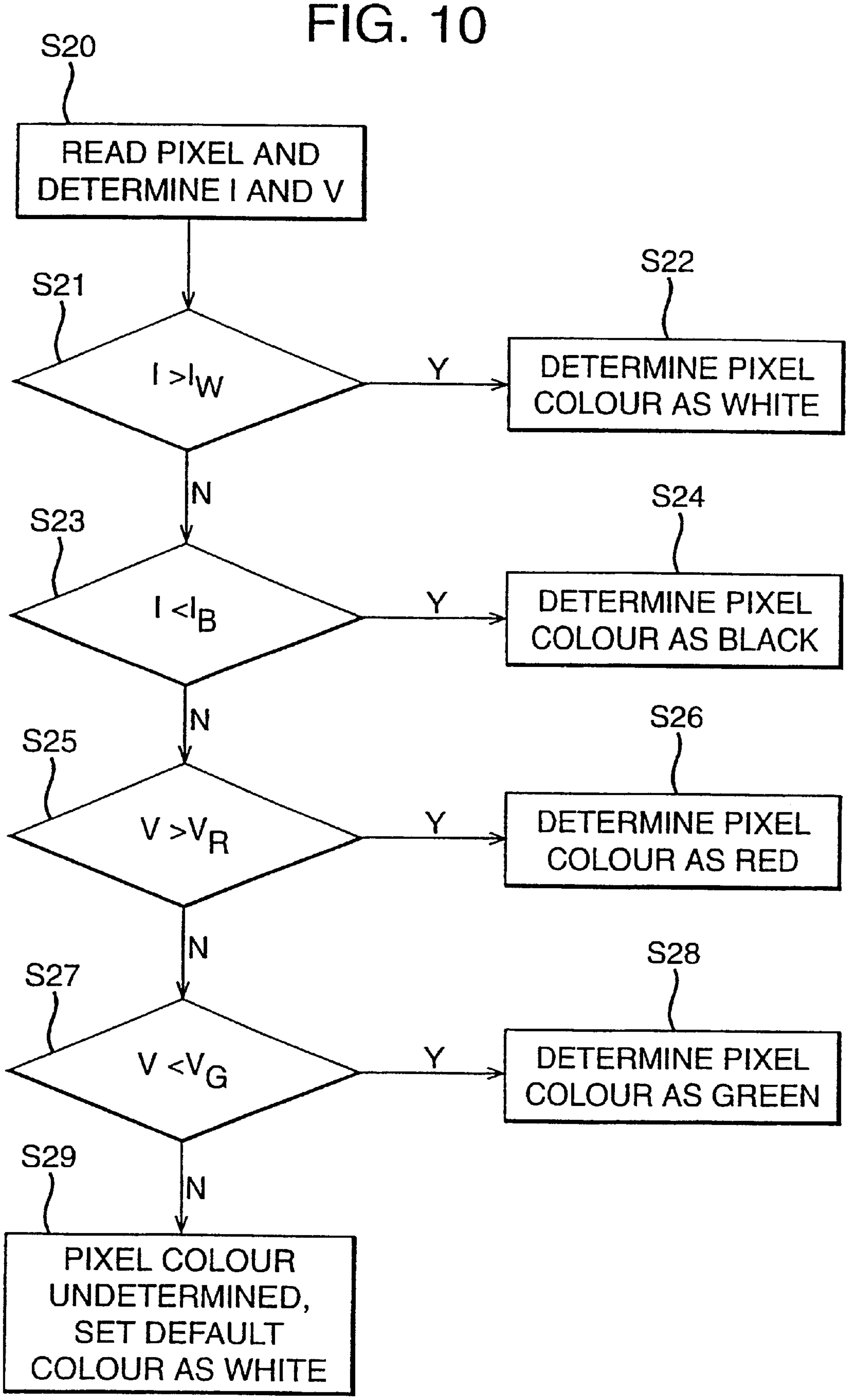
FIG. 10 is a flow diagram illustrating the process of color determination of each pixel.

FIG. 10 is a flow diagram illustrating the process of selecting or categorizing the color represented by the pixel.

In step S20, the pixel is read. In this embodiment, the pixel image data is provided from the digitizer 41 in YUV color space. The intensity and V component are obtained from the YUV color space pixel image data from Y and V, respectively. In step S21, the intensity I is then compared with a white threshold intensity IW, and if it is larger than the white threshold intensity IW, the pixel color is determined as being white in step S22. If the intensity I is not larger than the white intensity threshold IW in step S23, it is determined whether the intensity I is less than the black intensity threshold IB. If the intensity I is less than the black intensity threshold IB, in step S24 the color of the pixel is determined as black. If the intensity I is greater than the black intensity threshold IB, in step S25 the V component is compared with a red V component threshold VR. If the V component is larger than the red V component threshold VR, in step S26 the pixel color is determined as red. If the V component is determined not to be larger than the red V component threshold VR, in step S27 the V component is compared with the green V component threshold VG. If the V component is less than the green V component threshold VG, in step S28 the pixel color is determined as green. Otherwise, the pixel color is undetermined, and in step S29 the default color is set as white.

It can be seen from the process of FIG. 10 that simple thresholds can be used to categorize pixels into one of four categories: red, green, black or white. When sampling the video image in the colored pocket number region, not only can black, red and green pixels be identified, but white pixels can be identified because of not only the presence of the highly reflective numbers, but also because of spurius reflections.

Figure 11A:
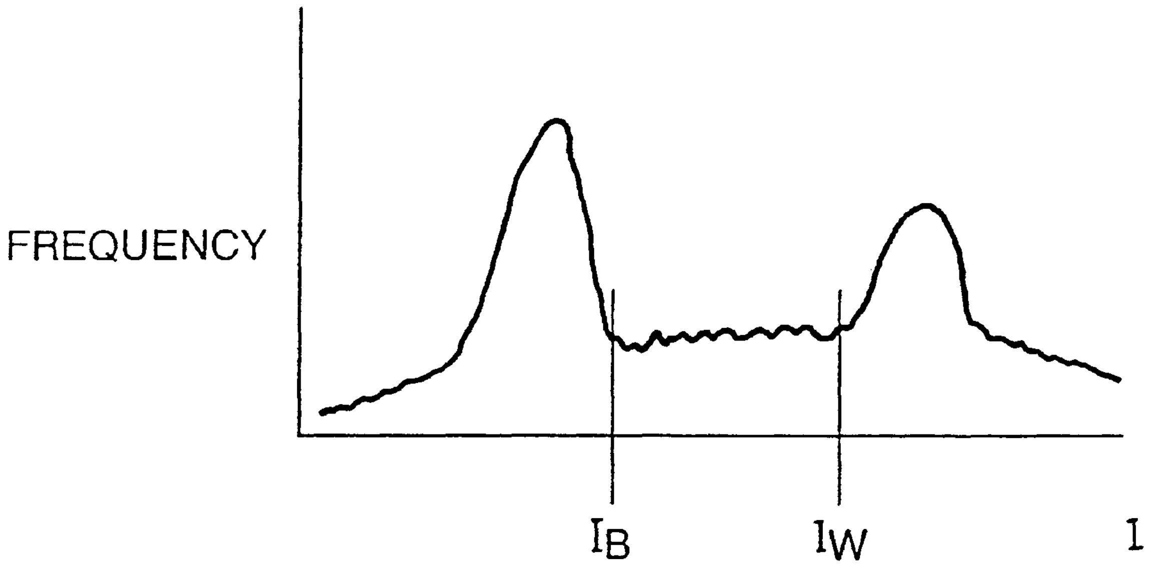
FIGS. 11*a* and 11*b* are graphs illustrating the method of determination of the thresholds IB IW VG and VR used in the method of FIG. 10.
Figure 11B:
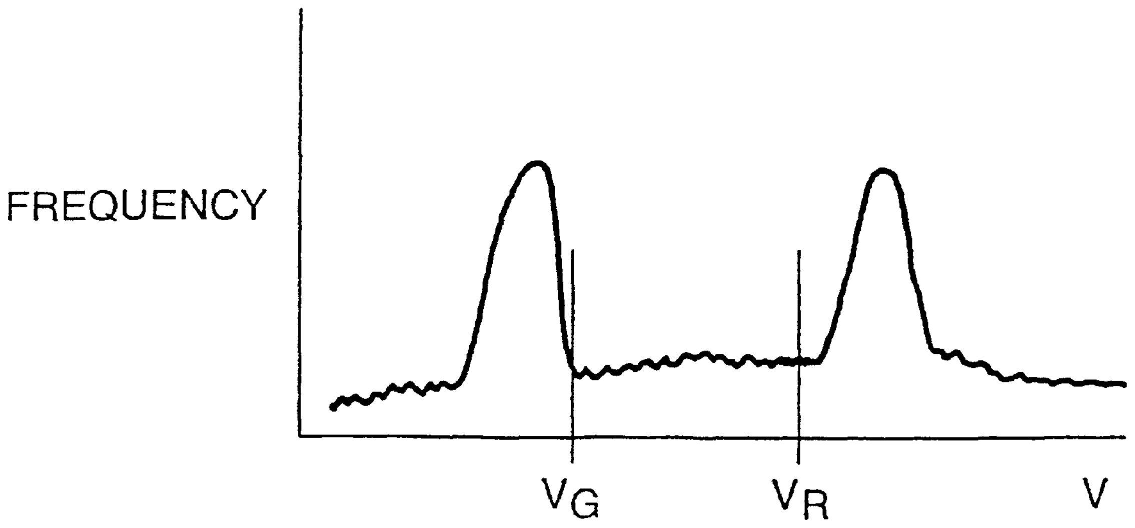

The coloring used in roulette wheels can vary greatly. Thus, in order to determine the correct thresholds to be used for color pixel determination, an embodiment to the present invention allows for automatic determination of the threshold value. This can be achieved by receiving video data when the roulette wheel is spinning. Motion analysis of the video image data enables the identification and elimination of static portions in the image, i.e., the non-moving sloping portion of the roulette wheel. Within the moving part of the image, for an image frame, I and V values for each pixel are determined and histograms are generated, as illustrated in FIGS. 11*a* and 11*b*. As these histograms illustrate, there is a low intensity peak corresponding to the color black, a high intensity peak corresponding to reflection from the numbers in the colored pocket number regions, i.e., white, a low V value peak corresponding to the green pockets, and a high V color peak corresponding to the red pockets. Thus, the thresholds IB, IW, VG and VR can simply be determined automatically via a suitable relationship with the peaks, as illustrated in FIGS. 11*a* and 11*b*.

Figure 13:
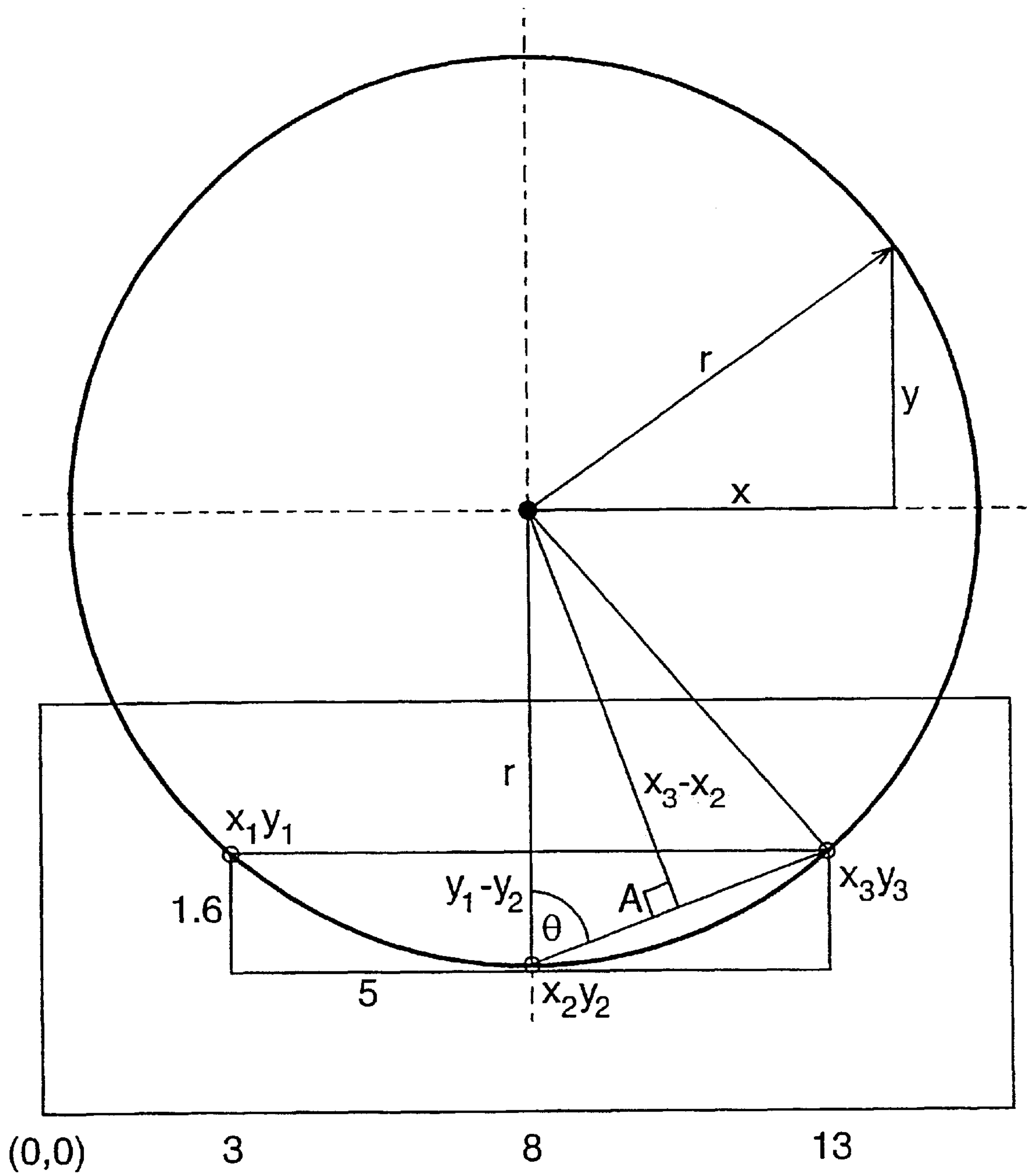
FIG. 13 is a diagram illustrating the geometry used in the determination of the points.
Figure 14:
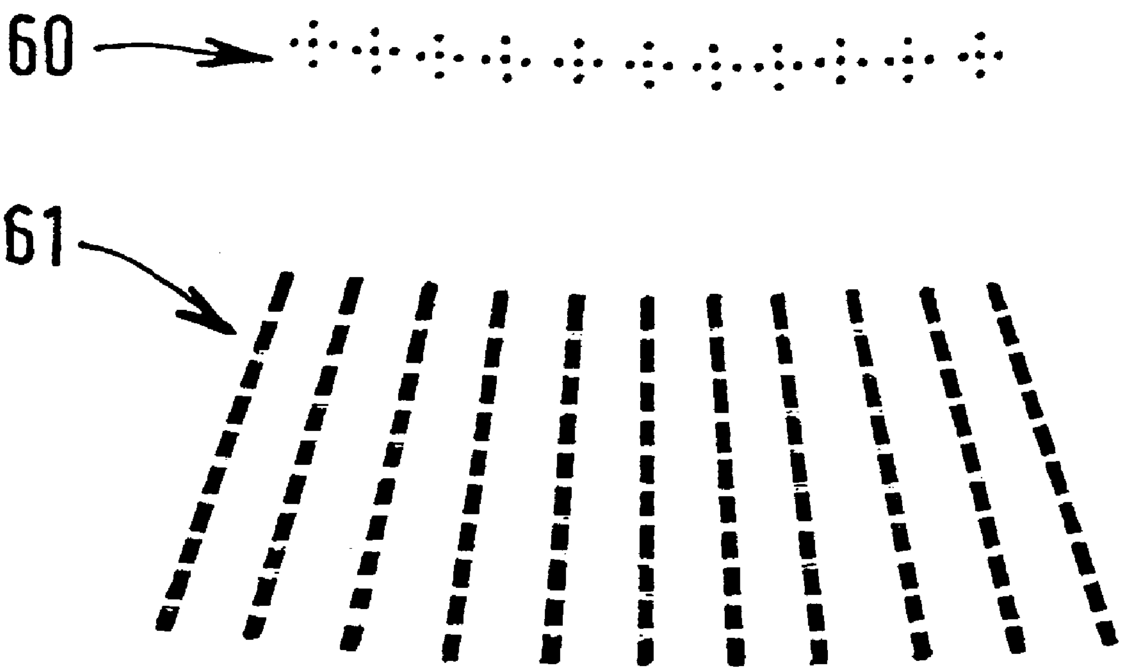
FIG. 14 is a diagram of the layout of the determined points.

The process of determining the color detection points and the search line points will now be described hereinafter with reference to FIGS. 12 to 14.

Figure 12:
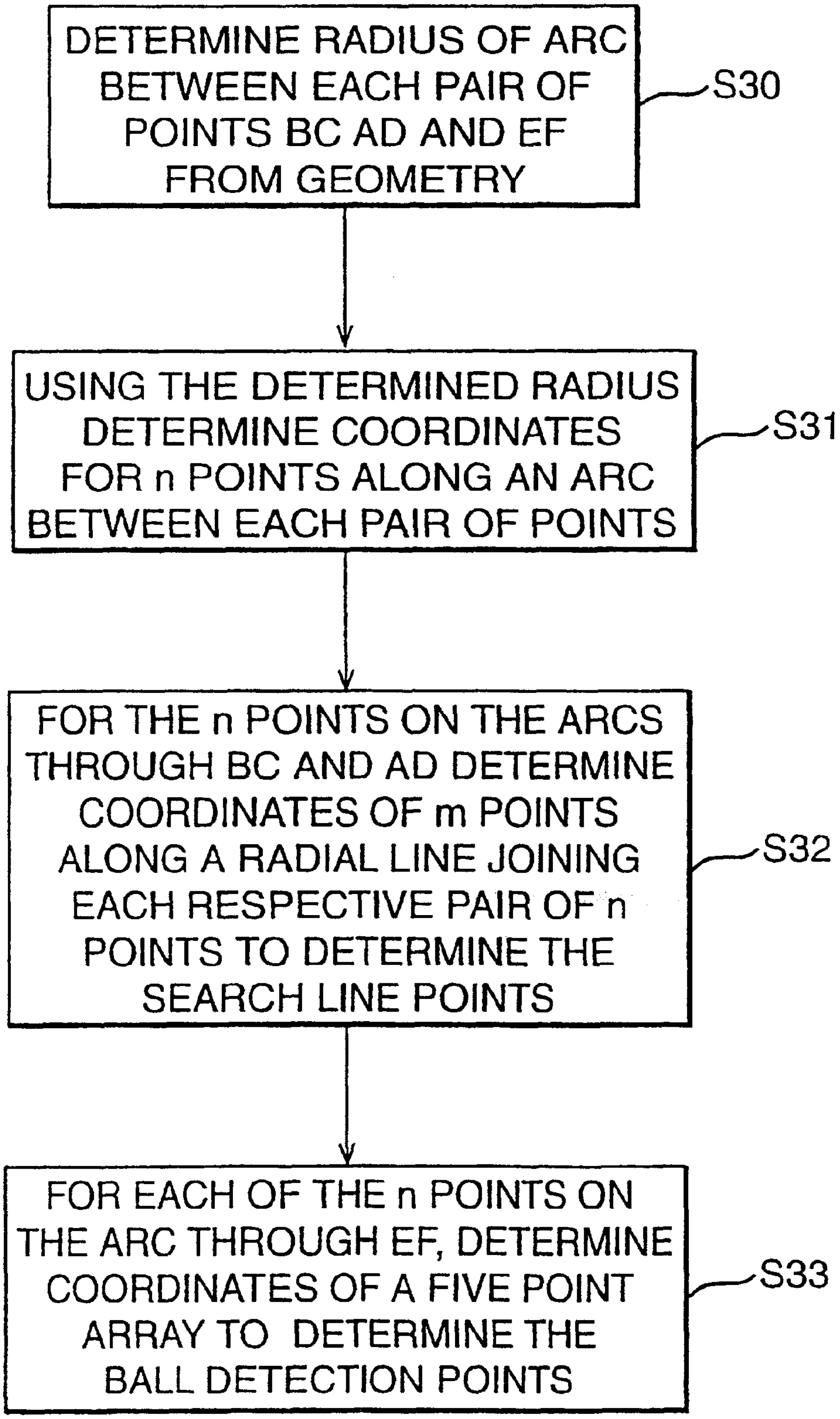
FIG. 12 is a flow diagram of the method of calculating the detection points in the fixed sample areas.

In the flow diagram of FIG. 12, in step S30, the radius of an arc between each pair of points BC, AD and EF is calculated from the geometry. This is illustrated in more detail in FIG. 13. Each pair of points BC, AD and EF can be mapped onto FIG. 13 at points $x_1y_1$ and $x_2y_2$. The vertex comprises the mid line y—y and point $x_3y_3$ is formed from the mirror symmetrical projection of the point $x_1y_1$. From this geometry the radius is given by the equation below:

$$\text{Radius} = \frac{[(y_1 - y_2)^2 + (x_3 - x_2)^2]^{\frac{1}{2}}}{2\cos\left[\frac{\pi}{2} - \text{Tan}^{-1}\left(\frac{y_1 - y_2}{x_3 - x_2}\right)\right]}$$

In step S31, using the determined radius, the coordinates for a number n points along an arc from each point $x_1y_1$ and $x_3y_3$ are determined. In this embodiment n is 11, and there are thus 11 equally spaced points along the arc across the pockets. In step S32, for the n points on the arcs through BC and AB, coordinates of m points along a radial line linking each respective pair of n points are determined to determine search line points. In step S33, for each of the n points on the arc through EF, coordinates of a five point array are determined, to determine the ball detection points. In this embodiment, the five point array comprises an array of five points lying on a cross. The pattern of points is illustrated in FIG. 14, and comprises a plurality of ball detection points 60 and an array of pocket color detection points 61. As can be seen in FIG. 14, the ball detection points 60 do not lie directly on the radial projections of the pocket color detection points 61. Rather, the ball detection points 60 are spread along the arc because this has been found to provide better detection.

Figure 15:
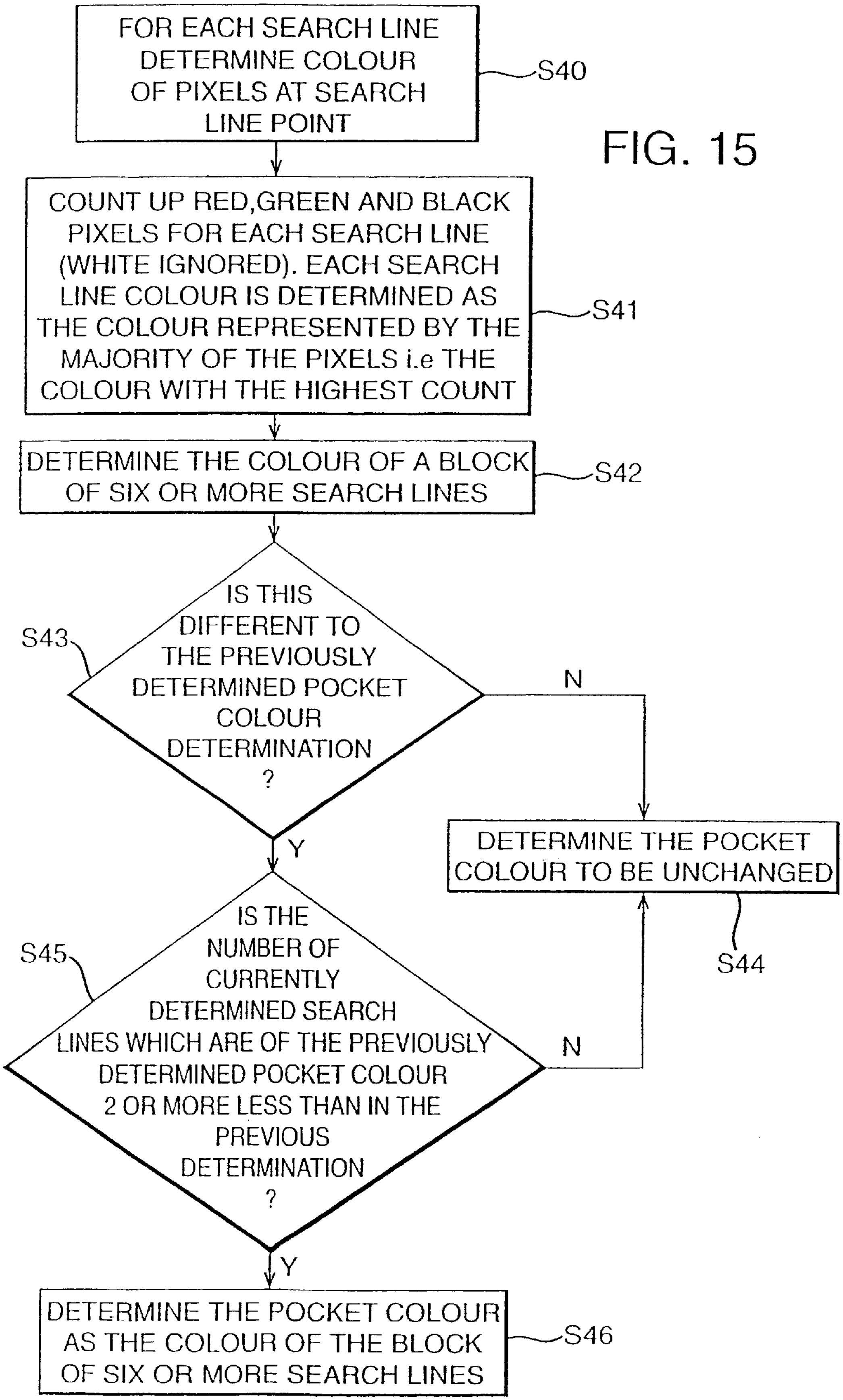
FIG. 15 is a flow diagram of the method of detecting the color of the colored number regions.
Figure 16A:
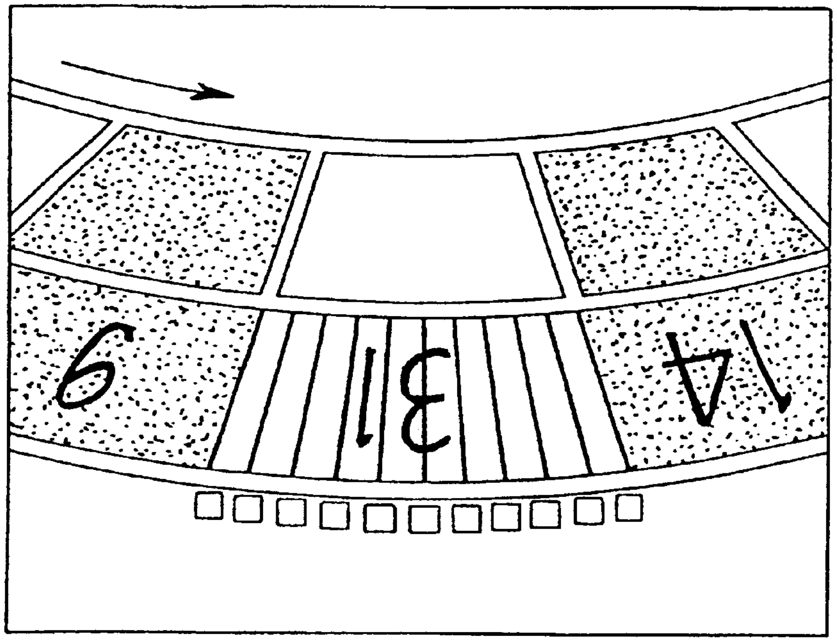
FIGS. 16*a* and 16*b* illustrate the color determination along radial lines in the sequential images in the section method illustrating in FIG. 15.
Figure 16B:
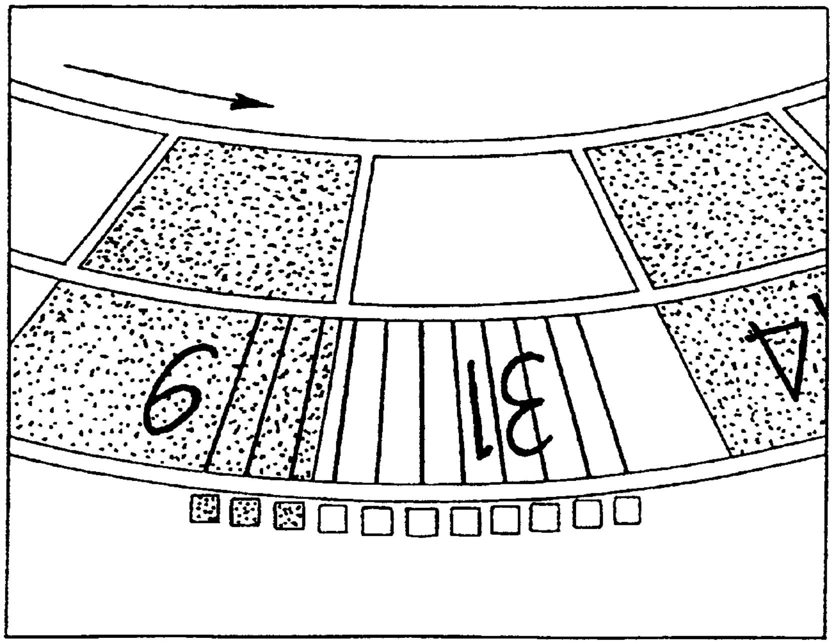

The process of color detection of the colored pocket number regions will now be described in more detail with reference to FIGS. 15, 16*a* and 16*b*.

In step S40, the color of the pixels at each search line point is determined for each search line. Pixels for each color (red, green and black) are counted up for each search line. White is ignored because it is not a valid color determination. The color for each search line is then determined as the color represented by the majority of the pixels, i.e., the color with the highest count along the search line in step S41. It can thus be seen that in FIG. 16*a,* because all of the search lines lie in the black pocket 31, the color determination indicated by the square boxes for each search line is black. As can be seen in FIG. 16*b,* both search lines that lie in the red colored pocket number region 9 are determined as red, as indicated in the square boxes.

In step S42, the color of a block of six or more search lines is then determined. In step S43, it is then determined whether the determined color is different to the previously determined color determination. If not, it is determined that the pocket color has not changed in step S44. If the color of the block of six or more search lines is different to the previous determination for the pocket color, in step S45 it is then determined whether the number of currently determined search lines which are of the previously determined pocket color are two or more less than in the previous determination: in other words, it is determined whether there has been a change of at least two search lines. If so, in step S46 the pocket color is determined as the color of the block of six or more search lines. If not, in step S44 it is determined that the pocket color remains unchanged. Thus, step S45 ensures that a change of one search line—due to "noise," for example—does not result in a change in color determination for the pocket. This "hysteresis" in the color pocket number detection makes the color determination less prone to errors.

The process of identifying the number of the pocket using the color determination will now be described with reference to FIG. 17.

In step S50, the process determines whether a transition to an index color such as green has been detected. If not, the process awaits such a transition. When a transition is detected, in step S51 it is determined whether the counter has reached a predetermined number, i.e., whether synchronization has been detected. The counter is a counter used to count the pockets. Thus if the correct number is counted in between detections of green pockets, the pocket identification process is in synch. If synchronization is detected in step S52, it is possible to calculate the speed of rotation of the roulette wheel in revolutions per minute (RPM). This information is a useful statistic for the remote monitoring of the performance of a croupier. In step S53, the counter can then be cleared. If synchronization is not detected, the process skips step S52 and proceeds straight to step S53 to clear the counter. In step S54, it is then determined whether the transition to green was from red. If so, in step S55 it is determined that the direction of rotation of the roulette wheel is clockwise. In step S56 it is then determined whether a transition to black is detected, which is the next expected color. If not, this indicates that there is an error, and the process returns to step S50 to await for the next transition to green. If the transition to black is detected in step S57, the counter is incremented to indicate the correct count for a pocket, and in step S58 the pocket number is determined from the determined direction and the count. The first pocket detected after the green zero will be the black 26, because this is the sequence of numbers. The sequence of numbers is stored for each direction, and the count enables identification of the number from either sequence, depending upon the direction of rotation.

After the detection of the first black pocket in step S58, then in step S59 it is determined whether there has been a transition to red. If not, this indicates an error and the process returns to step S50 to await a transition to green. If a red is detected in step S60, the counter is incremented, and in step S51 the pocket number is determined from the determined direction and the count. The pocket number in this case will be number 3. The process can then return to step S56 to sequentially detect the numbers around the roulette wheel.

If in step S54 it is determined that the transition is not from red to green, in step S62 it is determined whether the transition is from black to green. If not, this indicates that there has been an error, and the process returns to step S50 to await the next transition to green. If the transition is from black to green, in step S63 it is determined that the direction is counterclockwise, and the process similar to counting in the clockwise direction takes place in the counterclockwise direction, starting in step S59.

Figure 17:
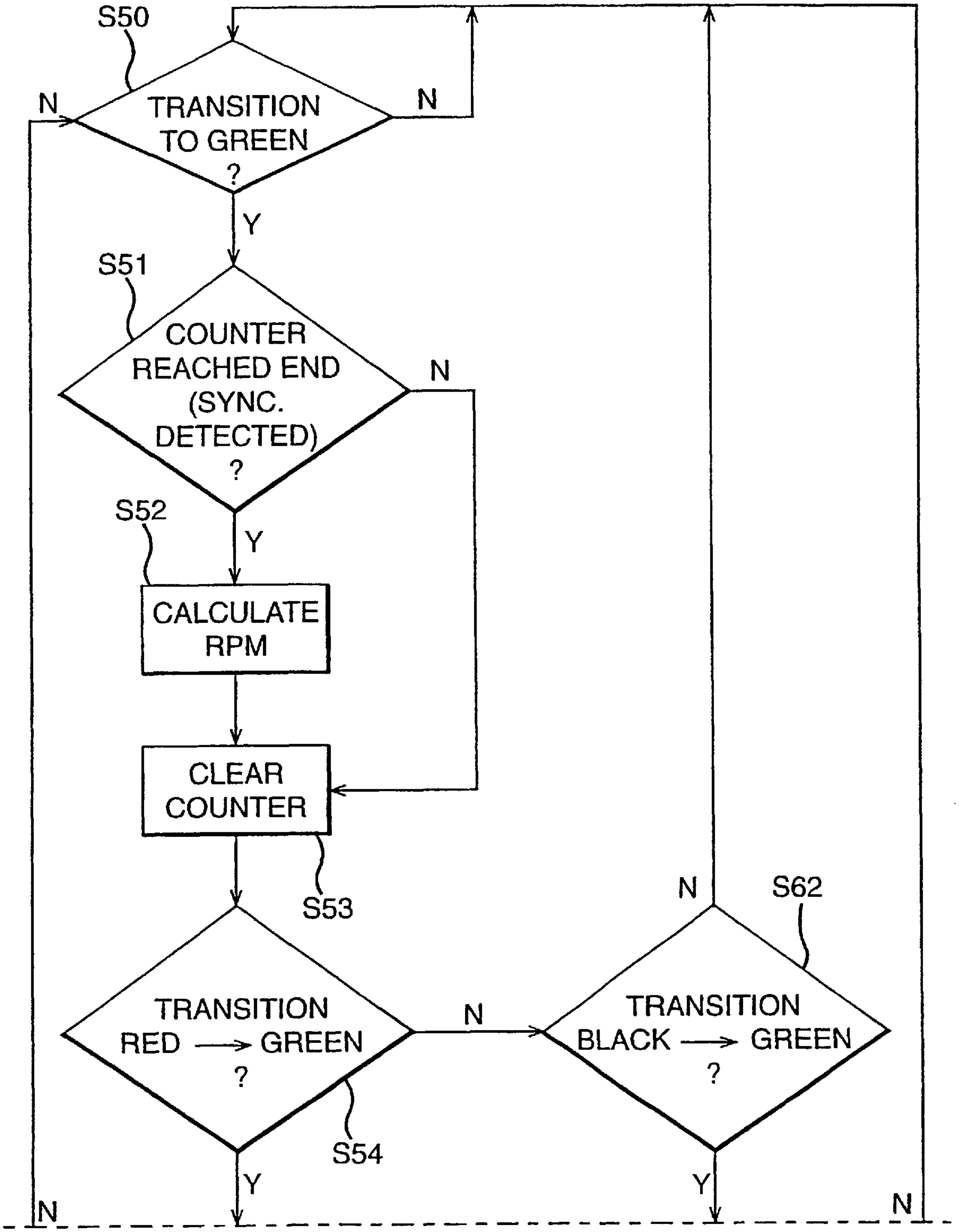
FIG. 17 is a flow diagram of the method of determining the identities of the colored pocket number regions in accordance with an embodiment of the present invention.

The process of FIG. 17 is applicable to a roulette wheel having a single green zero.

Figure 18:
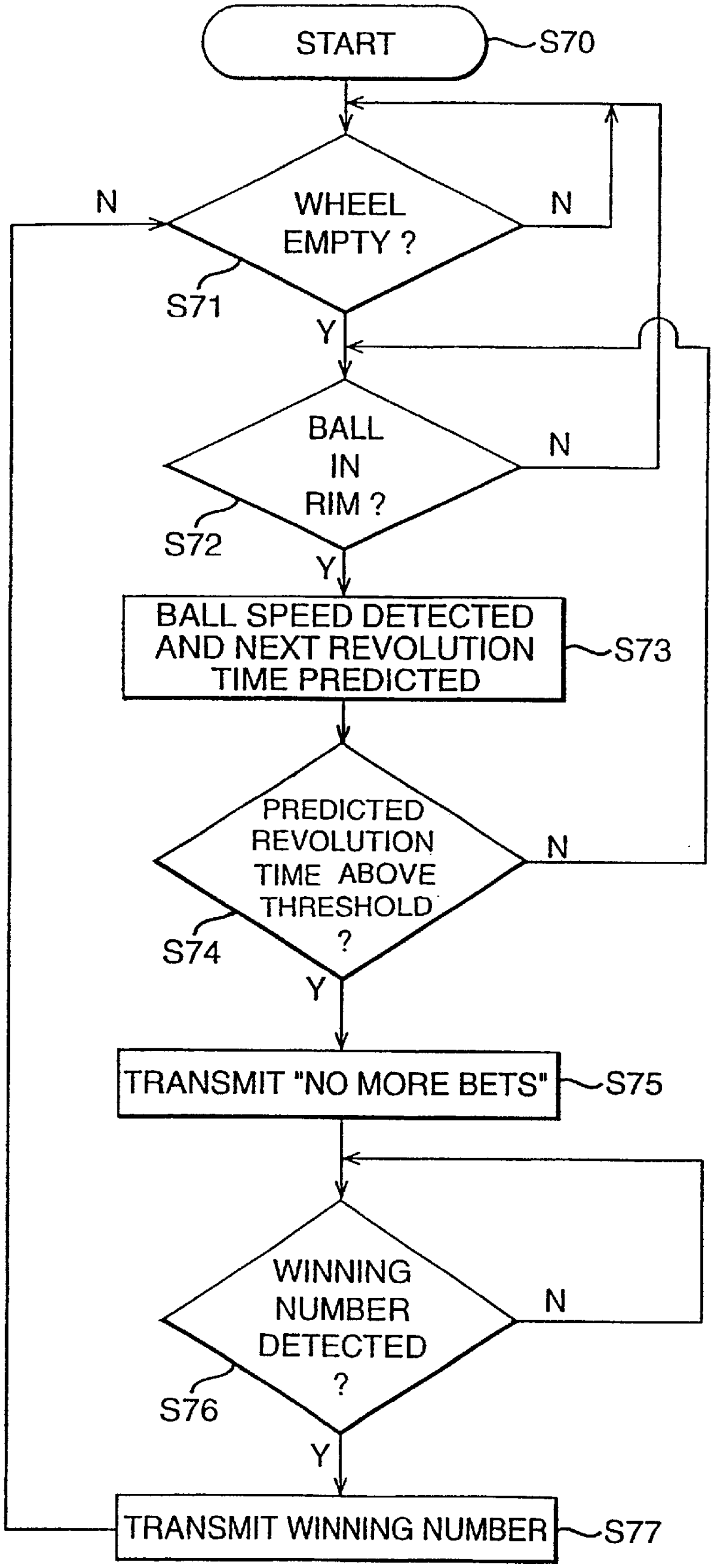
FIG. 18 is a flow diagram of a method of operation of the winning number display system.

The operation of the roulette wheel display system during a roulette game will now be described in more detail with reference to FIG. 18.

In step S70, the process starts, and in step S71 the process waits until it is detected that there is no ball in a pocket and there is no ball in the rim. Then, in step S72, the process waits until a ball is detected in the rim by the sensor 14. When a ball is detected in the rim, in step S73 the ball's speed is detected and the time predicted to be taken by the ball for the next revolution is determined. If the predicted time as determined in step S74 is less than a threshold, this indicates that the ball will not drop in the next revolution, and thus in step S72 the ball is detected in the rim and the ball's speed redetected in step S73. Once it is determined in step S74 that the ball speed is predicted to fall such that the predicted time taken by the ball for the next revolution is above the threshold, in step S75 a "no more bets" signal is transmitted, and in step S76 it is determined whether a winning number has been detected, i.e., whether a ball has been detected as falling into a pocket. The process waits until the winning number has been detected, and once the winning number has been detected in step S77 the winning number is transmitted, and the process returns to step S71 to await the removal of the ball so that the game can be played again.

The detection of the winning number is based on the detection of a ball in a pocket. The ball is detected using the ball detection points. In order to determine the presence of a white ball, if four out of the five points in a cluster are white, the point is determined as detecting white. When four or more near consecutive points in the arc indicate white detection, it is determined that a ball is present.

The embodiment described hereinabove has been described with reference to a roulette wheel having a single green zero pocket. However, roulette wheels are commonly in use which include two diametrically opposed green pockets, one being a zero and the other being a double zero. For such a wheel, it is impossible to detect the direction of rotation of the wheel by looking at the color transitions to the green pocket, because the green pockets are surrounded by pockets of identical color (i.e., the single zero green pocket is surrounded by two black pockets, and the double zero green pocket is surrounded by two red pockets). Thus, another technique must be used to determined the direction of rotation. One such technique which can be used is frame comparison. Two successive image fields, or frames, can be compared to determine the direction of motion by detecting the direction of motion of the edges of the pocket number regions.

Figure 19:
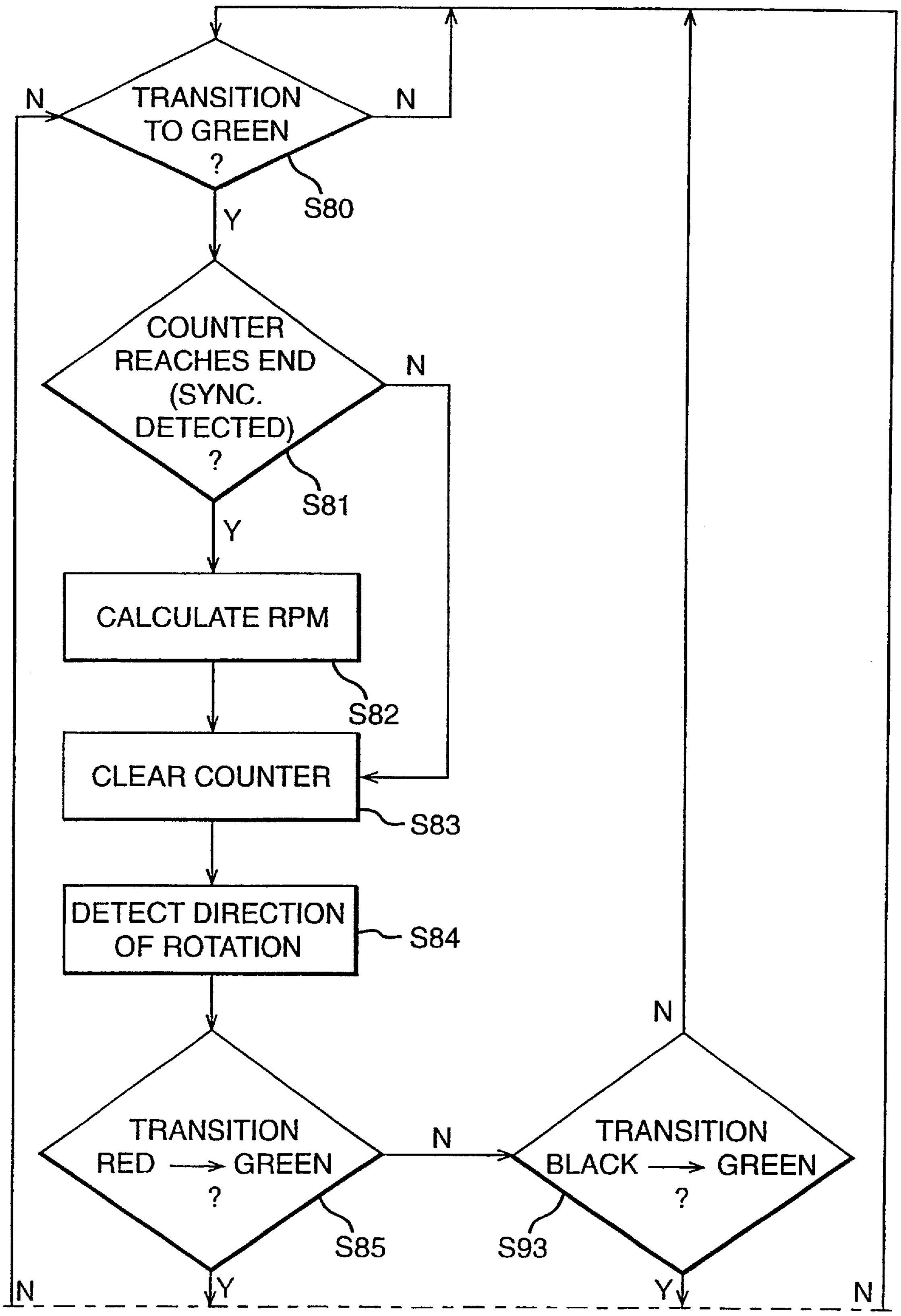
FIG. 19 is a flow diagram of the method of determining the identities of colored pocket number regions for a roulette wheel having a green single zero colored pocket numbered region and a green double zero colored pocket numbered region.

In addition to the difficulty in detecting the direction of motion, the method of identifying the colored pocket number regions is also different, and will be described hereinafter with reference to FIG. 19. In step S80, a transition to green is awaited. When a transition to green is detected in step S81, it is determined whether the counter has reached the end, and thus synchronization is detected. If so, in step S82 the speed of rotation of the roulette wheel can be calculated, and in step S83 the counter is cleared. If the counter has not reached its end, it indicates that synchronization is not achieved, and thus the calculation of the speed rotation of the roulette wheel is skipped, and proceeds to step S83 to clear the counter. In step S84, the direction of rotation is then detected as described hereinabove, and in step S85 it is determined whether the transition to green was from red. If so, in step S86 it is determined that the synchronization pocket is the green double zero pocket. In step S87 it is then determined whether a transition to red is detected. If not, this indicates an error and the process returns to step S80 to await a transition to green. If a transition to red is detected in step S87, the counter is incremented in step S88, and in step S89 the pocket number is determined from the determined direction, the determined synchronization pocket identity (green double zero) and the count. Then in step S90 it is determined whether the next transition is to black. If not, this indicates an error and the process returns to step S80. If a transition to black is detected in step S90, in step S91 the counter is incremented and in step S92 a pocket number is determined from the determined direction of rotation, the determined synchronization pocket (green double zero) and the count. The process then returns to step S87 to repeatedly detect red and black colored pockets.

If in step S85 the transition detected is not from red to green, in step S93 it is determined whether the transition is from black to green. If not, this indicates an error and the process returns to step S80. If the transition is detected as being from black to green in step S93, in step S94 the synchronization pocket is determined as the green zero pocket. In step S90 it is then determined whether the next transition is detected as being to black. If not, this indicates an error and the process returns to step S80. If the transition to black is detected, in step S91 the counter is incremented and in step S92 the pocket number is determined from the determined direction of rotation, the determined synchronization pocket (the green zero) and the count. The process then proceeds to step S87 and continues as previously described to repeatedly detected red and black pockets.

Although the present invention has been described hereinabove with reference to specific embodiments, modifications will be apparent to a skilled person in the art within the spirit and scope of the present invention.

For example, although the described technique for determining the areas for the sample points uses correlation techniques, any form of pattern recognition technique can be used. Also, although in the present invention the color determination uses a form of voting, any technique can be used for analyzing the colors determined at each point in order to decide upon the detected color. Further, the color determination technique uses intensity I and the V value. The present invention is not, however, limited to such color determination techniques and any color coordinates can be used in any color coordinate system. The particular preferred technique of using thresholds in a scalar sequence technique for color pixels determination can be replaced with a vector comparison in IV space, for example, or any other color coordinate space.

In the embodiments described hereinabove, during calibration, the white ball is placed in the green pocket and used as a target to determine its position. However, in the French roulette wheel, the pockets are deeper and far less of the ball is visible, thus making it more difficult to determine the ball position. It is thus possible to instead use a target placed in the pocket, such as a white or blue piece of material which can be easily distinguished over the background colors of the roulette wheel.

We claim:

1. A system for detecting a winning number in a roulette game played on a roulette wheel having a rim, a cylinder carrying pockets for receiving a roulette ball and pocket number regions corresponding to respective ones of said pockets, each colored pocket number region having a characteristic color, including at least one colored pocket number region having a characteristic index color, arranged in a known sequence thereon, comprising:

a video camera mounted on the rim of said roulette wheel so as to image only a section of said roulette wheel, and wherein said video camera is adapted to generate color video data comprising a video image of a region of said roulette wheel through which said pockets and said corresponding colored pocket number regions pass when the cylinder of said roulette wheel is spun;

a first sampler for sampling said video data at an array of points in a first specified area of said video image corresponding to a region of said roulette wheel through which said colored pocket number regions will pass when the cylinder of said roulette wheel is spun;

an identifier for identifying said colored pocket number region in said first specified area using said sampled video data provided by said first sampler based on the color of said colored number pocket region and said known sequence of colored pocket number regions;

a second sampler for sampling said video data at a plurality of points in a second specified area of said video image corresponding to a region in which said ball can be expected to be present when said ball is in the pocket corresponding to said identified colored pocket number region;

a first determiner for determining whether said ball is in the pocket corresponding to said identified colored pocket number region using said sampled video data provided by said second sampler; and an output for outputting the identity of said identified colored pocket number region as the winning number if said ball is determined to be in said corresponding pocket by said first determiner.

2. The system according to claim 1, further comprising a second determiner for determining the direction of rotation of said roulette wheel and a memory for storing at least one pocket number sequence, wherein said identifier identifies said colored pocket number region by matching the sequence of determined colors of colored pocket number regions passing through said first specified area after a colored pocket number region of a specified index color passes through said first specified area with the direction of rotation of said roulette wheel determined by said second determiner and said at least one pocket number sequence stored in said memory.

3. The system according to claim 2, wherein said second determiner determines the said direction of rotation by determining whether the color transition to the determination of said specified index color is from a red colored pocket number region or from a black colored pocket number region.

4. The system according to claim 1, further comprising a second determiner for determining the direction of rotation of said roulette wheel based on a comparison of sequential video images provided by said video camera.

5. The system according to claim 1, wherein each video image comprises an image data field, and wherein said first sampler and said second sampler are adapted to sample each said image data field.

6. The system according to claim 1, wherein each video image comprises an image data frame, and wherein said first sampler and said second sampler are adapted to sample each image data frame.

7. The system according to claim 1, wherein said array of points in a first specified area of said video image are arranged along a plurality of spaced radial lines substantially perpendicular to the expected direction of motion of said colored pocket number regions in said color video image; and wherein said identifier determines the color of said colored pocket number region by identifying, for each point in each of said plurality of spaced radial lines, the color of said color video image at that point, associating each of said plurality of spaced radial lines with a color corresponding to the most identified color at points lying along that line, and identifying the color of said colored pocket number region as the color associated with the majority of said plurality of radially spaced lines.

8. The system according to claim 7, wherein said identifier is adapted to determine the color of said colored pocket number region as the color associated with a threshold number of said radial lines of points.

9. The system according to claim 1, wherein said index color is green, and wherein said identifier and said first determiner are adapted to determine the color of said video image at each point in said respective array of points and plurality of points as being red, green, black or white by comparing the color of each pixel of said video image at each said point with specified color threshold values.

10. The system according to claim 9, wherein said identifier and said first determiner are adapted to determine the color of said video image at each point in said respective array of points and plurality of points by determining the intensity value and the V value in YUV color space for each pixel of said video image at each said point and comparing the intensity and V values with specified intensity threshold and V threshold values, black being determined when the intensity value is below a specified intensity threshold value, red being determined when the V value is above a specified V threshold value, green being determined when the V value is below a specified V threshold value, and white being determined when the intensity value is above a specified intensity threshold value.

11. The system according to claim 1, further comprising a processor and program storage, wherein said first and second samplers, said determiner, said identifier and said output comprise computer program routines implemented by said processor and stored as instructions in said program storage.

12. The system according to claim 1, further comprising an automatic calibrator for automatically determining by pattern recognition said first specified area in which said array of points is arranged and said second specified area in which said ball can be expected to be present when said ball is in a pocket corresponding to an identified colored pocket number region.

13. The system according to claim 12, wherein said automatic calibrator comprises:

a first calibrator identifier for identifying the position in said video image of a target object placed by a user in a predetermined one of said pockets and positioned in front of said video camera;

a second calibrator identifier for searching in a predetermined region of said video image relative to said identified position of said target object to identify said first specified area within said colored pocket number region corresponding to said predetermined pocket;

a first point assignor for assigning the location of points of said array of points in the image within said first specified area within said color pocket number region;

a third calibrator identifier for identifying said second specified area in relation to said identified target object position; and a second point assignor for assigning the location of said plurality of points in said video image within said second specified area.

14. The system according to claim 13, wherein said target object is said roulette ball.

15. The system according to claim 1, wherein said index color is green, further comprising a color threshold determinor for determining the color distribution of pixels in an image of said green, red and black colored pocket number regions, and for determining thresholds to be used in color determination by said identifier and said first determiner using said color distribution.

16. A system for detecting a winning number in a roulette wheel game played on a roulette wheel having a rim, a plurality of pockets for receiving a roulette ball at the conclusion of a roulette spin, each of said plurality of pockets having a corresponding colored pocket number region, comprising:

a video camera mounted on a rim of said roulette wheel so as to image only a section of the roulette wheel, for generating color video image data of at least one said pocket and at least one said corresponding colored pocket number region;

an identifier for identifying a first specified area within said colored pocket numbered region in said image, and a corresponding second specified area in said image within a corresponding pocket in which said roulette ball can be expected to be present at the conclusion of a roulette spin; and a video processor for sampling successive video images within said first and second identified specified areas to identify said colored pocket number regions as they pass said first specified area in each of said successive video images, and to identify if said ball is present in the pocket corresponding to said identified colored pocket number region, wherein said processor identifies said colored pocket number regions from at least the color of said colored pocket number region depicted in said first specified area and a known sequence of pocket identities.

* * * * *